United States Patent
Winston

(10) Patent No.: US 10,352,589 B2
(45) Date of Patent: *Jul. 16, 2019

(54) SOLAR THERMAL CONCENTRATOR APPARATUS, SYSTEM, AND METHOD

(71) Applicant: Roland Winston, Merced, CA (US)

(72) Inventor: Roland Winston, Merced, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/663,455

(22) Filed: Mar. 20, 2015

(65) Prior Publication Data

US 2016/0273804 A1 Sep. 22, 2016
US 2017/0097175 A9 Apr. 6, 2017

Related U.S. Application Data

(63) Continuation of application No. 13/153,802, filed on Jun. 6, 2011, now abandoned.

(60) Provisional application No. 61/385,890, filed on Sep. 23, 2010.

(51) Int. Cl.
| | | |
|---|---|---|
| *F24J 2/05* | (2006.01) | |
| *F24J 2/12* | (2006.01) | |
| *F24J 2/24* | (2006.01) | |
| *F24J 2/04* | (2006.01) | |
| *F24S 10/40* | (2018.01) | |
| *F24S 10/25* | (2018.01) | |
| *F24S 10/70* | (2018.01) | |
| *F24S 10/30* | (2018.01) | |
| *B21D 53/02* | (2006.01) | |
| *F24S 23/71* | (2018.01) | |
| *F24S 23/70* | (2018.01) | |
| *F24S 23/74* | (2018.01) | |
| *F24S 10/75* | (2018.01) | |

(52) U.S. Cl.
CPC .............. *F24S 10/45* (2018.05); *B21D 53/02* (2013.01); *F24S 10/25* (2018.05); *F24S 10/30* (2018.05); *F24S 10/40* (2018.05); *F24S 10/70* (2018.05); *F24S 10/75* (2018.05); *F24S 23/71* (2018.05); *F24S 23/74* (2018.05); *F24S 23/80* (2018.05); *F24S 2010/71* (2018.05); *Y02B 10/22* (2013.01); *Y02E 10/44* (2013.01); *Y02E 10/45* (2013.01); *Y10T 29/49355* (2015.01)

(58) Field of Classification Search
CPC  F24J 2/12; F24J 2/24; F24J 2002/1023; F24J 2002/241; G02B 19/0019; G02B 19/0042
USPC .............. 126/674, 651, 652, 654, 655, 666; 359/850–859

See application file for complete search history.

(56) References Cited

U.S. PATENT DOCUMENTS

| | | | | |
|---|---|---|---|---|
| 3,227,153 A | * | 1/1966 | Godel | ................ F24J 2/055 126/652 |
| 4,002,499 A | * | 1/1977 | Winston | ............... G02B 5/10 136/206 |
| 4,130,107 A | * | 12/1978 | Rabl | ................ F24J 2/067 126/684 |

(Continued)

FOREIGN PATENT DOCUMENTS

FR  0004805 A2 * 10/1979  ............. F24J 2/0488

*Primary Examiner* — Avinash A Savani
*Assistant Examiner* — Rabeeul I Zuberi
(74) *Attorney, Agent, or Firm* — Ashok Tankha

(57) ABSTRACT

An apparatus is disclosed including: a trough shaped reflector extending along a longitudinal axis and including at least one reflective surface having a shape which substantially corresponds to an edge ray involute of the absorber.

4 Claims, 28 Drawing Sheets

(56) References Cited

U.S. PATENT DOCUMENTS

| | | | | |
|---|---|---|---|---|
| 4,261,334 A * | 4/1981 | Matthews | ........... | F24D 17/0021 |
| | | | | 126/572 |
| 4,340,035 A * | 7/1982 | Begun | ......................... | F24J 2/07 |
| | | | | 126/676 |
| 4,387,961 A * | 6/1983 | Winston | .................. | F24J 2/1047 |
| | | | | 126/690 |
| 4,483,007 A * | 11/1984 | Winston | ................ | H01S 3/0931 |
| | | | | 359/855 |
| 4,543,946 A * | 10/1985 | Gill | ............................ | F24J 2/07 |
| | | | | 126/650 |
| 5,275,148 A * | 1/1994 | Ranyak | ....................... | F24J 2/06 |
| | | | | 126/665 |
| 2008/0204888 A1* | 8/2008 | Kan | ......................... | F21S 8/026 |
| | | | | 359/629 |
| 2009/0107489 A1* | 4/2009 | Gee | ......................... | F24J 2/0483 |
| | | | | 126/646 |
| 2011/0006163 A1* | 1/2011 | Wait | .......................... | B64G 1/44 |
| | | | | 244/172.8 |
| 2013/0092154 A1* | 4/2013 | Lu | .............................. | F24J 2/18 |
| | | | | 126/600 |
| 2013/0152917 A1* | 6/2013 | Couturier | ................... | F24J 2/07 |
| | | | | 126/663 |
| 2014/0060518 A1* | 3/2014 | Lee | ............................ | F24J 2/07 |
| | | | | 126/674 |

* cited by examiner

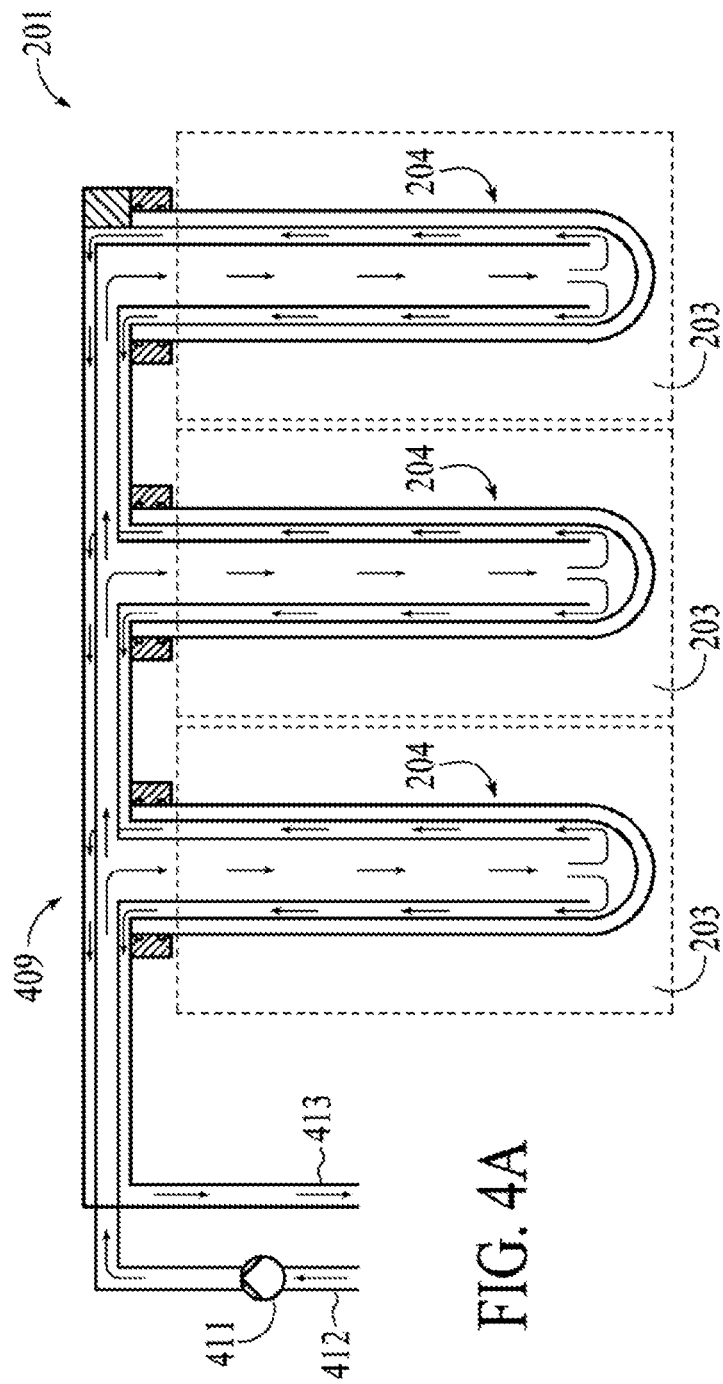

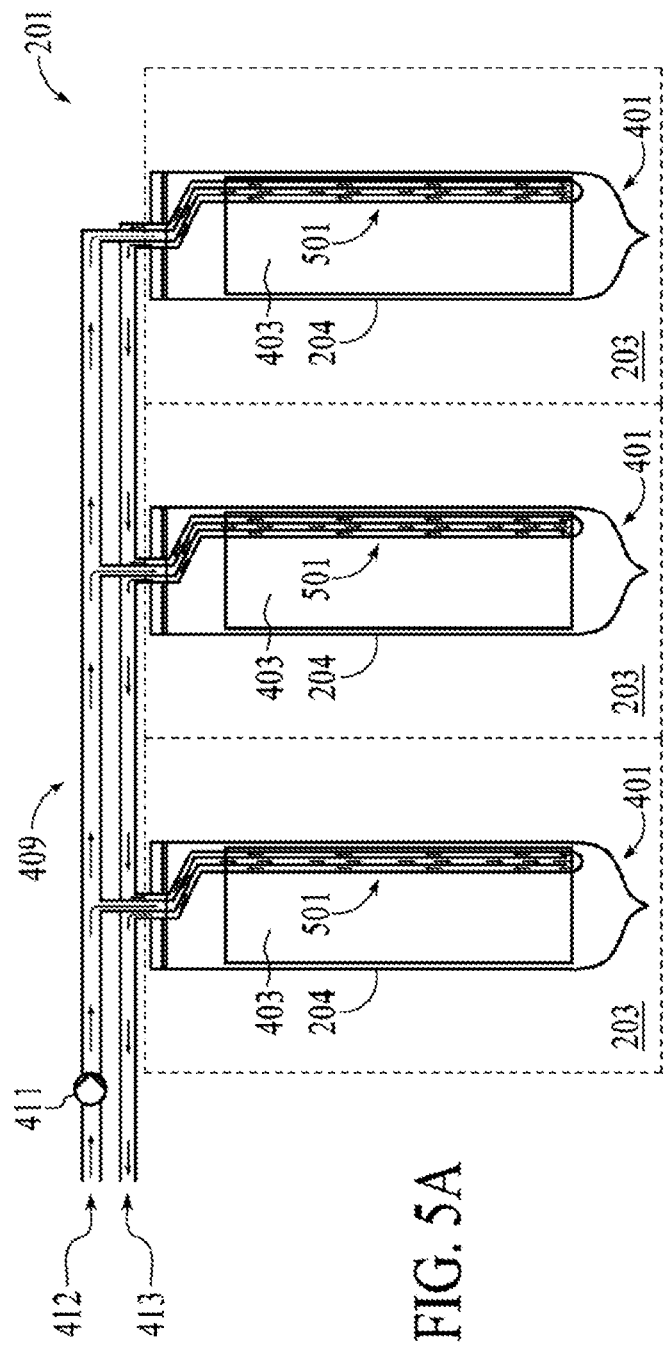
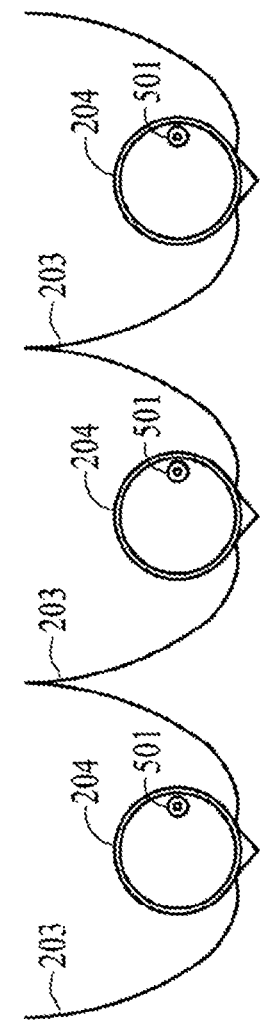
FIG. 5A
FIG. 5B

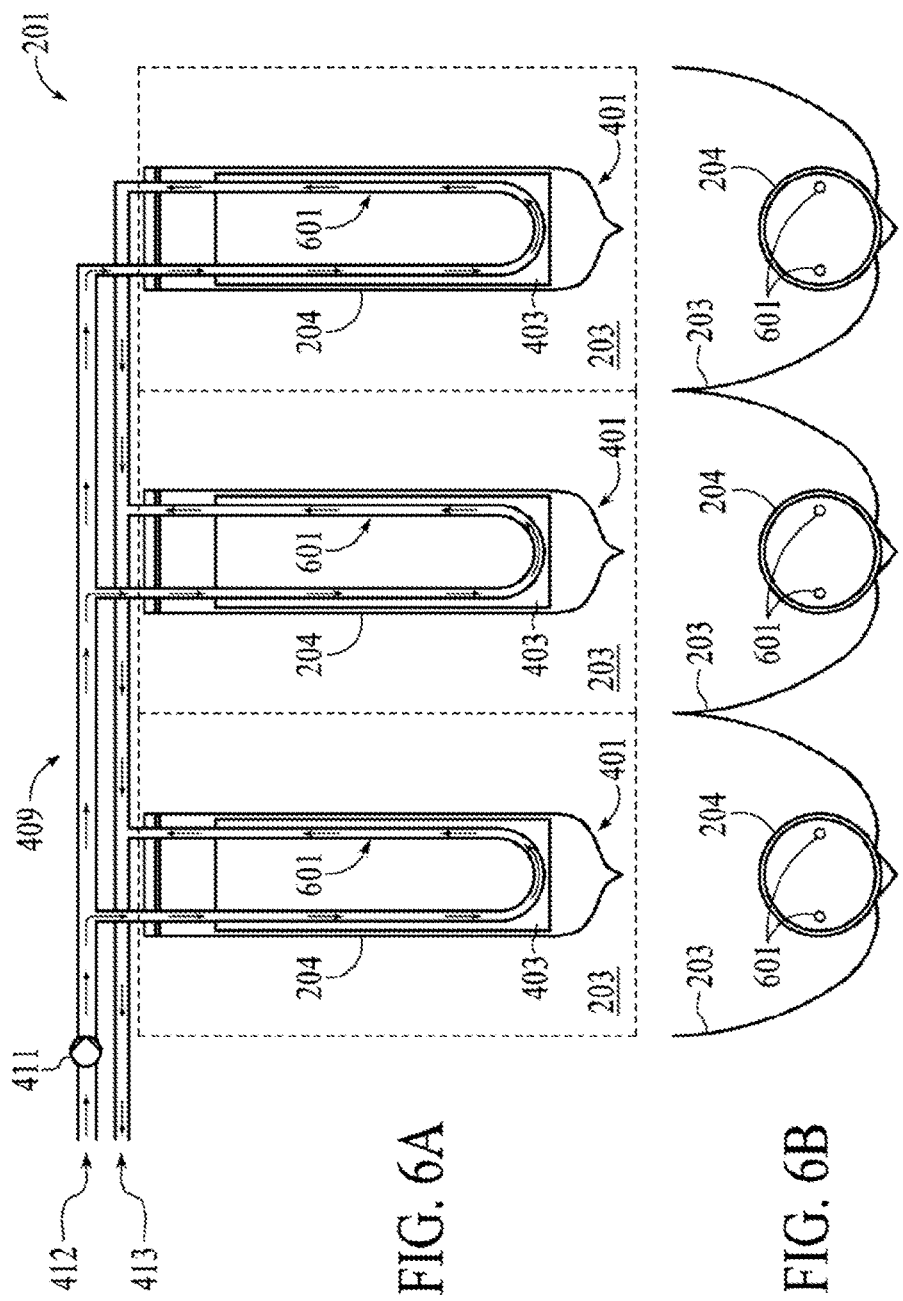

The ellipsoid paradox: the ellipsoid images B at A "perfectly" and the sphere images A on itself "perfectly".

SOLAR THERMAL CONCENTRATOR APPARATUS, SYSTEM, AND METHOD

CROSS REFERENCE TO RELATED APPLICATIONS

1. This application is a continuation application of non-provisional patent application Ser. No. 13/153,802, titled "SOLAR THERMAL CONCENTRATOR APPARATUS, SYSTEM, AND METHOD", filed Jun. 6, 2011 in the United States Patent and Trademark Office, which claims the benefit of U.S. provisional patent application No. 61/385,890, filed on Sep. 23, 2010 in the United States Patent and Trademark Office.
2. The specifications of the above referenced applications are incorporated herein by reference in their entirety.

STATEMENT OF RIGHTS UNDER THE INVENTION

This invention was made with government support. The invention was made with the State of California's support under the California Energy Commission contract No. 5005-05-21. The Energy Commission has certain rights to this invention.

BACKGROUND OF THE INVENTION

This disclosure relates to devices for the transmission of radiation, especially of light. In particular, it is related to a non-focusing reflector for the concentration of radiation such as sunlight at a desired region over a wide range of angles of incidence.

A number of systems for passive or non-tracking reflecting concentration of solar energy have been produced in the past. Among such systems are those shown in U.S. Pat. Nos. 5,537,991; 4,002,499; 4,003,638; 4,230,095; 4,387,961; 4,359,265; 5,289,356; and 6,467,916, which are all incorporated by reference in their entirety. It is appropriate to refer to the reflectors as light-transmission devices because it is immaterial whether the reflectors are concentrating radiation from a large solid angle of incidence (e.g. concentrating solar light onto a solar cell) or broadcasting radiation from a relatively small source to a relatively large solid angle (e.g. collecting light from an LED chip to form a beam).

Concentration of radiation is possible only if the projected solid angle of the radiation is increased. This requirement is the direct consequence of the law of conservation of the etendue, which is the phase space of radiation. Solar concentrators which achieve high concentration must track the sun; that is, they must continuously reorient in order to compensate for the apparent movement of the sun in an earth center (Ptolemaic) coordinate system. Reflectors, in contrast, are fixed in position for most lighting purposes. For tracking collectors the direction to the center of the sun is stationary with respect to their aperture. Such concentrators can achieve very high concentrations of about 45,000 in air. Even higher concentrations have been achieved inside transparent media.

Tracking, however, is technically demanding because solar collectors are commonly fairly large and designing these systems for orientational mobility may add significantly to their cost. Moreover, the absorber, which typically incorporates some heat transfer fluid as well as piping, also may need to be mobile. This is the motivation to study the concentration which can be achieved with stationary, non-tracking devices. The same principles apply when it is desired to deliver light or other radiant energy from a small source to a relatively large solid angle.

SUMMARY OF THE INVENTION

The inventor has realized that a concentrator assembly may be used, e.g., to collect solar energy to produce heat. Embodiments of the concentrator assembly feature a wide acceptance angle, allowing for use in non-tracking applications. Embodiments of the concentrator assembly feature a high collection efficiency (e.g., about 50% or greater) at high operating temperatures (e.g., 150 C or more, 200 C or more, etc.).

In one aspect, an apparatus is disclosed for concentrating light to an elongated absorber including: a trough shaped reflector extending along a longitudinal axis having at least one reflective surface having a shape which substantially corresponds to an edge ray involute of the absorber.

In some embodiments, the reflector has a first side and a second side disposed symmetrically on opposing sides of an optic plane transverse the longitudinal axis. Each side of the reflector includes a reflective surface having a shape which substantially corresponds to an edge ray involute of the absorber.

In some embodiments, the absorber includes a cylindrical absorber extending in the direction of the longitudinal axis and disposed at the bottom of the trough shaped reflector.

In some embodiments, the reflector includes an entrance aperture located at a top of the trough. In some embodiments, substantially all light incident on the entrance aperture at angles less than an acceptance angle are concentrated to the absorber.

In some embodiments, the reflector concentrates light at the thermodynamic limit.

In some embodiments, the absorber is spaced apart from the reflector by a gap distance; and a portion of the reflector at the bottom of the trough includes a reflective cavity having a reflective surface with a shape that deviates substantially from the edge ray involute of the absorber.

In some embodiments, the cavity includes a V-shaped trough extending along the bottom of the reflector in the direction of the longitudinal axis.

In some embodiments, the V-shaped trough includes an aperture positioned such that the image of the absorber reflected in a wall of the V-shaped trough has a top which is positioned proximal or above the aperture of the V-shaped top in the direction extending from the top of the trough to the bottom of the trough.

Some embodiments are characterized by an efficiency loss averaged over the acceptance angle relative to an equivalent gapless concentrator of 0.02 or less.

Some embodiments are characterized by a concentration ratio equal to at least 90% of that of an equivalent gapless concentrator.

In some embodiments, the gap distance is less than a radius of the absorber.

In some embodiments, the reflector concentrates light to the absorber with a concentration ratio C of 1.0 or greater, of 1.25 or greater, of 1.5 or greater, of 1.75 or greater, of 2.0 or greater, or more.

In some embodiments, a reflective surface of the reflector has a reflectivity of 90% or more for solar light.

In some embodiments, a reflective surface of the reflector has a reflectivity of 94% or more for solar light.

In some embodiments, the reflector has an acceptance angle of at least 25 degrees, at least 35 degrees, or at least 45 degrees, or at least 60 degrees, or more.

In another aspect, an apparatus for concentrating light to an absorber is disclosed including: at least one reflective surface configured to receive light incident at angles less than an acceptance angle and concentrate the received light to the absorber. The concentrator is characterized in that substantially any light ray emitted from the absorber would exit the concentrator without returning to the absorber. In some embodiments, at least one reflective surface includes a surface which corresponds to an edge ray involute of the absorber.

In another aspect, an apparatus is disclosed for converting incident solar light to heat, including: an evacuated tubular enclosure extending along a longitudinal axis from a proximal end to a distal end; a tubular absorber element located within the evacuated enclosure, and including a selective surface configured to absorb solar light incident through the evacuated enclosure and convert the solar light to heat; and a U-shaped tube in thermal contact with the absorber element. The U-shaped tube may include: a fluid input and a fluid output located at the proximal end of the tubular enclosure; an input portion extending from the fluid input along an interior surface of the tubular absorber element; and an output portion extending from the fluid output along an interior surface of the tubular absorber element; and a curved portion located proximal the distal end of the enclosure and providing fluid communication between the input and output portions. In some embodiments, the input portion and the output portion are spaced apart.

In some embodiments, fluid input into the fluid input at a first temperature travels though the U-shaped tube, absorbs heat from the selective absorber, and is output from the output at a second temperature higher than the first.

In some embodiments, the selective surface has an absorptivity of at least 0.75 and an emissivity of 0.25 or less at temperatures greater than 100 C.

In some embodiments, the selective surface has an absorptivity of at least 0.9 and an emissivity of 0.1 or less at temperatures greater than 100 C.

In some embodiments, the selective surface has an absorptivity of at least 0.9 and an emissivity of 0.1 or less at temperatures greater than about 200 C.

In another aspect, an apparatus is disclosed for concentrating light to an elongated absorber including: a trough shaped reflector extending along a longitudinal axis, the reflector spaced apart from the absorber. In some embodiments, the reflector has a portion of at least one reflective surface having a shape which substantially corresponds to an edge ray involute of a virtual absorber surrounding the absorber and contacting the reflector.

In some embodiments, the ratio of the area of the virtual absorber to the area of the absorber is 0.9 or greater.

In some embodiments, a portion of the reflector at the bottom of the trough includes a reflective cavity having a reflective surface with a shape that deviates substantially from the edge ray involute of the virtual absorber.

In some embodiments, the cavity includes a V-shaped trough extending along the bottom of the reflector in the direction of the longitudinal axis.

In some embodiments, the V-shaped trough includes an aperture positioned such that the image of the absorber reflected in a wall of the V-shaped trough has a top which is positioned proximal or above the aperture of the V-shaped top in the direction extending from the top of the trough to the bottom of the trough.

Some embodiments are characterized by an efficiency loss averaged over acceptance angle relative to an equivalent gapless concentrator of 0.02 or less.

In another aspect, a collector system is disclosed for converting solar light to heat including: a working fluid; at least one absorber element; and at least one concentrator. In some embodiments, the at least one concentrator concentrates solar light onto the absorber element to generate heat; and the working fluid flows through the absorber element to extract heat from the absorber element.

In some embodiments the at least one concentrator includes an apparatus of the type described above. In some embodiments, the absorber element includes an apparatus of the type described above.

In some embodiments, the system converts solar light to heat with an efficiency of about 30% or greater at an operating temperature of about 200 C or greater.

In some embodiments, the system converts solar light to heat with an efficiency of about 40% or greater at an operating temperature of about 200 C or greater.

In some embodiments, the system converts solar light to heat with an efficiency of about 45% or greater at an operating temperature of about 200 C or greater.

In some embodiments, the system converts solar light to heat with an efficiency of about 50% or greater at an operating temperature of about 200 C or greater.

In some embodiments, the system converts solar light to heat with an efficiency of about 30% or greater at an operating temperature of about 180 C or greater.

In some embodiments, the system converts solar light to heat with an efficiency of about 40% or greater at an operating temperature of about 180 C or greater.

In some embodiments, the system converts solar light to heat with an efficiency of about 45% or greater at an operating temperature of about 180 C or greater.

In some embodiments, the system converts solar light to heat with an efficiency of about 50% or greater at an operating temperature of about 180 C or greater.

In some embodiments, the system is characterized by an angular acceptance of at least 35 degrees.

In some embodiments, the system is characterized by an angular acceptance of at least 45 degrees.

In some embodiments, the system is characterized by an angular acceptance of at least 60 degrees.

In another aspect, a method is disclosed of converting solar light to heat including: using an apparatus of the type described above, concentrating light onto an absorber to generate heat.

In another aspect, a method is disclosed of converting solar light to heat including: receiving solar light with an apparatus of the type described above to generate heat.

In another aspect, a method is disclosed of converting solar light to heat including: receiving solar light with a system of the type described above to generate heat.

Various embodiments may include any of the above described features, either alone, or in combination.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4A is a top view of a concentrator assembly.
FIG. 4B is a side view of a concentrator assembly.
FIG. 5A is a top view of a concentrator assembly.
FIG. 5B is a side view of a concentrator assembly.
FIG. 6A is a top view of a concentrator assembly.
FIG. 6B is a side view of a concentrator assembly.

DETAILED DESCRIPTION OF THE INVENTION

Figure 1:
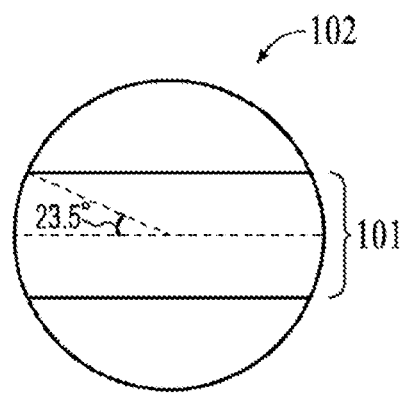
FIG. 1 is an illustration of the solar geometry.

From a thermodynamic viewpoint, the solar geometry may be described in direction cosines, which are the momenta of the light rays. Referring to FIG. 1, the sun over the year occupies a band 101 inside a unit radius circle 102 which is ±sin 23.5 deg. This band is nearly ⅙ the area of the circle, from which follows, e.g. as described in detail U.S. Pat. No. 6,467,916 to Roland Winston (incorporated herein by reference in its entirety), that the maximum theoretical concentration for a trough shaped concentrating reflector using no seasonal adjustments is very close to 2.

In some embodiments, this limit may be increased. In cases where the target (absorber) is immersed in a refractive material having an index of refraction (n), this limit is multiplied by n squared because the momentum of a light ray is actually the index of refraction×direction cosine. For example, for n~1.5 (typical of glass or PMMA) and restricting the absorber irradiance to 60 deg., the maximum concentration becomes ~3. In some embodiments featuring a low concentration design which can be switched seasonally between 2 positions each year (summer and winter) the limits are multiplied by 2 (4-6 concentration). For example, embodiments described herein may feature a concentration of about 4 or more.

Figure 2:
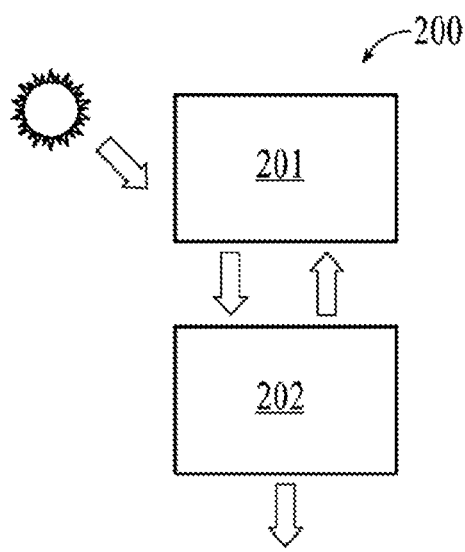
FIG. 2 is an illustration of a system for converting solar light into another form of energy.

FIG. 2 shows a system 200 for converting solar light into another form of energy, e.g., heat. A concentrator assembly 201 receives light from the sun. One or more concentrators concentrate the incident solar light onto one or more absorbers, which convert the light to heat. This heat is transferred from the concentrator assembly 201, e.g., using a circulating heat transfer fluid to a heat exchanger 202. The heat exchanger 202 outputs the heat received from the concentrator assembly 201. The output heat may be used for any suitable purpose including, e.g., providing building heating, generation of electricity, generation of mechanical power, etc.

Figure 3A:
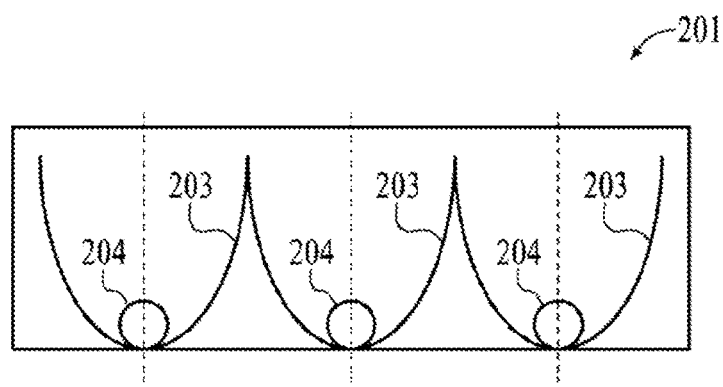
FIG. 3A is a side view of a concentrator assembly.
Figure 3B:
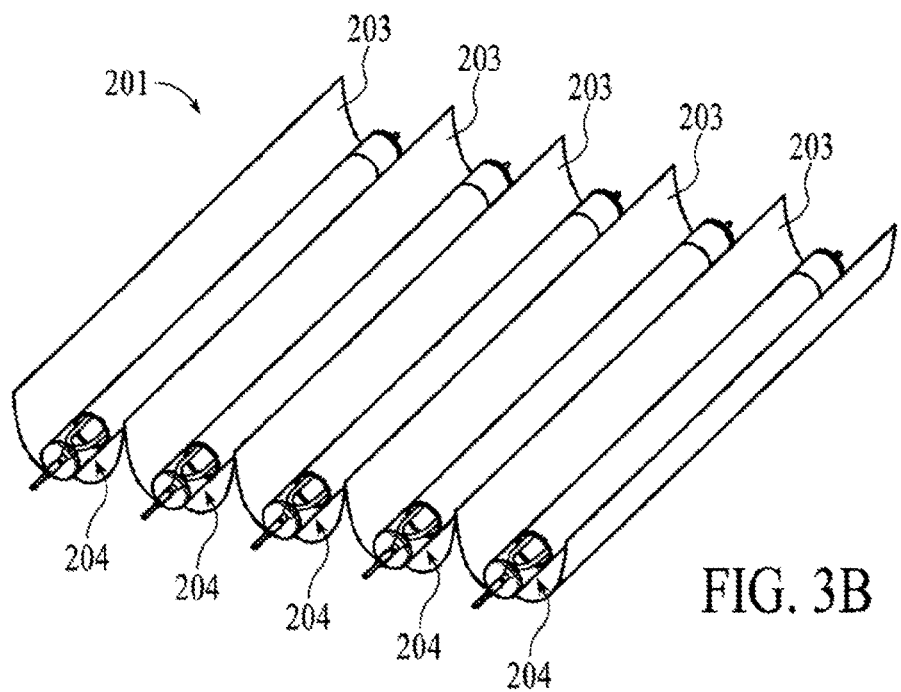
FIG. 3B is a perspective view of a concentrator assembly.

FIGS. 3 A and 3B illustrate exemplary embodiments of the concentrator assembly 201. The concentrator assembly 201 includes one or more optical concentrators 203. Three concentrators 203 are shown in FIG. 3A, five are shown in FIG. 3B, and any other number may be used in other embodiments. Each concentrator 203 concentrates incident solar light onto a corresponding absorber 204. The absorber 204 absorbs concentrated solar light and transforms it to heat.

As shown, the concentrators 203 and absorbers 204 are arranged in a linear array. However, any suitable arrangement may be used. The concentrators 203 are trough shaped reflectors having an open top end and tapering to a trough bottom. The inner surface of the trough is reflective, e.g., with a reflectivity to solar light of e.g., 80% or more, 90% or more, 95% or more, etc. In some embodiments, the reflective surface may include a reflective coating, e.g., of the types available from Alanod Solar GmbH of Ennepetal, Germany and ReflecTech, Inc. of Arvada, Colo.

The absorbers 204 are elongated tubular (e.g., cylindrical) elements positioned at or near the bottom of the trough shaped reflectors. As shown, each of the concentrators 203 is symmetric about an optical plane (indicated with a dashed line in FIG. 3A). In one embodiment, the concentrator 203 may include a U shape. In another embodiment, the concentrator 203 may include any shape known in the art so as to concentrate an optical amount of energy to a predetermined location. In some embodiments, a heat transfer working fluid (e.g., water, oil, an organic fluid, or any other suitable fluid known in the art) flows through the absorbers 204 (e.g., in a series arrangement, in a parallel arrangement, etc.). Heat from the absorbers 204 is transferred to the fluid, which flows out of the concentrator assembly 201 to the heat exchanger 202. The energy preferably is captured and used for a predetermined purpose.

As shown, the concentrators 203 and corresponding absorbers 204 are arranged in a linear array. In some embodiments, the concentrators may be arranged with a center to center spacing of 1.0 m or less, 0.5 m or less, 0.25 m or less, 0.1 m or less, e.g., in the range of 100-400 mm. In some embodiments, the absorbers 204 may have an outer diameter of 100 mm or less, 75 mm or less, 50 mm or less, e.g., in the range of 40-60 mm.

As described greater detail below, in some embodiments, concentrators 203 concentrate substantially all solar light incident at angles to the optic plane less than an acceptance angle to the absorber 204. In some embodiments, the concentrator 203 concentrates light incident at angles less than the acceptance angle with an efficiency at the thermodynamic limit. In some embodiments, the concentrator 203 concentrates light incident at angles less than the acceptance angle with a geometric concentration ratio of C of 1.0 or more, 1.1 or more, 1.25 or more, 1.5 or more, 1.75 or more, 1.85 or more, 1.9 or more, 2 or more, etc. In some embodiments this concentration is provided over the year without tracking.

Figure 4C:
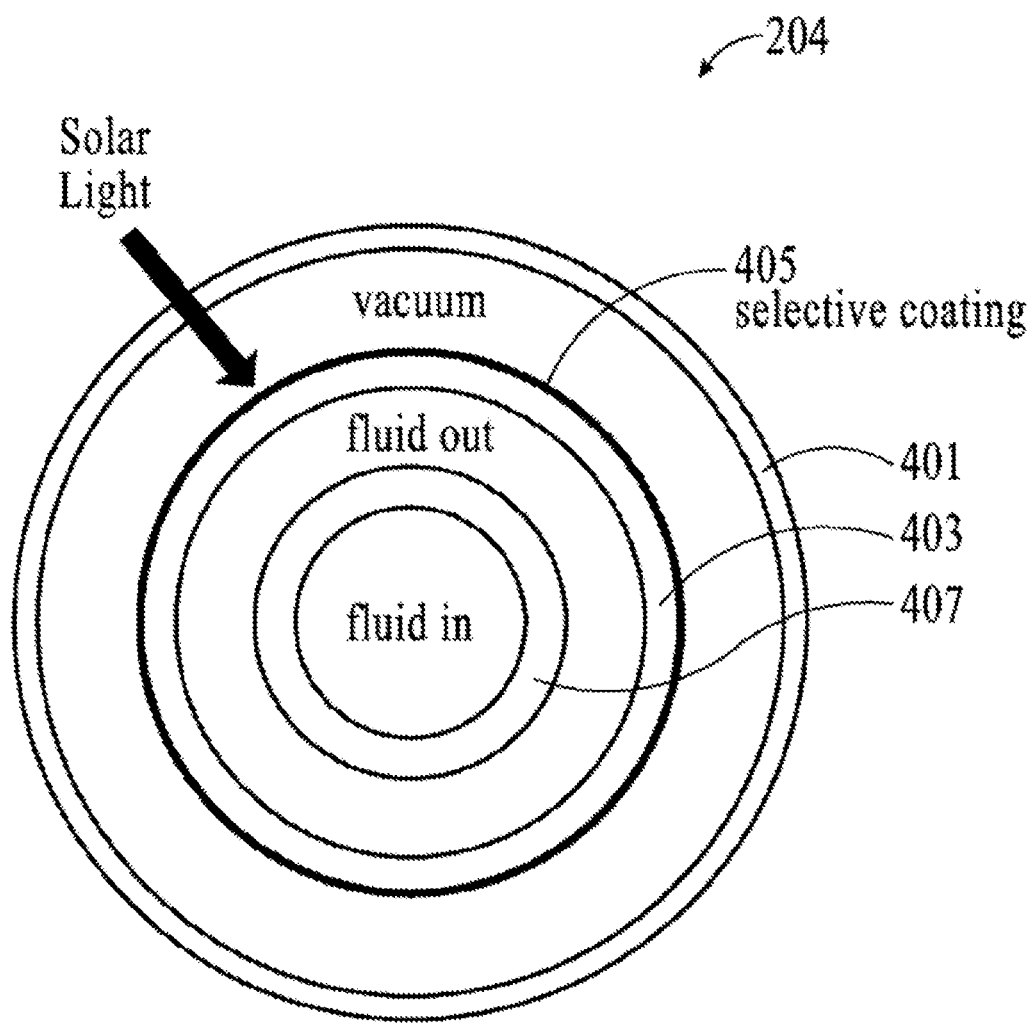
FIG. 4C is a cross section of an absorber used in the concentrator assembly of FIGS. 4A-4B.

FIGS. 4A-4C illustrate an exemplary embodiment of the collector assembly 201 featuring absorbers 204 having a counter flow arrangement. As shown, absorbers 204 are cylindrical members having an outer transparent evacuated enclosure 401 (e.g., a glass tube). Located within the enclosure is a tubular absorber fin 403 (e.g., an extruded aluminum or copper pipe) which absorbs solar light incident through the enclosure 401 and transforms the light to heat. The absorber fin 401 may include a selective surface 405 which exhibits a high absorptivity to solar light and a low emissivity (thereby limiting radiative heat loss). For example, in some embodiments, the selective surface 405 may exhibit an absorptivity of 0.75 or more, 0.9 or more, 0.95 or more, 0.99 or more etc. (e.g., in the range of 0.9 to 0.99). For example, in some embodiments, the selective surface 405 may exhibit an emissivity of 0.25 or less, 0.10 or less, 0.05 or less, 0.025 or less etc. (e.g., in the range of 0.04 to 0.05). In some embodiments, the selective surface exhibits these absorptivity and emissivity properties at temperature of 100 C or greater, 150 C or greater, 175 C or greater, or 200 C or greater (e.g., in the range of 150-200 C). In some embodiments, the selective surface comprises an aluminum nitride coating, e.g., sputtered on to the outer (vacuum facing) surface of absorber fin 401. In other embodiments, any other suitable surface or coating known in the art may be used.

Absorber fin 403 is disposed about an inner tube 407 (e.g., an extruded aluminum or copper pipe). Heat transfer working fluid flows in to the inner tube 407 to the end of the tube. The fluid returns from the end of the tube through an annular space between the inner tube 407 and the absorber fin 403 (i.e., in a "counter-flow" arrangement). As the fluid passes through the absorber 204, the fluid absorbs heat from the absorber fin 403 and carries the heat away from the absorber 204. That is, the fluid enters the absorber at a first temperature, is heated during its passage, and is output at a second temperature higher than the first temperature.

In some embodiments, absorber fin 403 may be made of glass (or other non-metallic material) and coated with a selective surface 405. In some such embodiments, the absorber fin 403 and the enclosure 401 may be joined using only glass on glass seals, or may be constructed as an integral unit. Similarly, inner tube 407 may be made of glass (or other non-metallic material) allowing for the reduction or elimination of glass on metal seals and/or allowing absorber 204 to be formed as an integral or substantially integral unit. In one embodiment, the reflective material may comprise a reflective paint, or a mirrored surface.

Concentrator assembly 201 includes a plumbing system 409 which facilitates the flow of heat transfer fluid through the absorbers 204. A pump 411 pumps fluid along an input plumbing line 412 and into the absorbers 204. For example, pump 411 may pump the fluid with a mass flow rate of 40 g/s or more, 50 g/s or more, 60 g/s or more, 70 g/s or more, 80 g/s or more, e.g., in the range of 40-45 g/s. As described above, the fluid is heated during counter flow action. An output plumbing line 413 carries the heated fluid away from concentrator assembly 201, e.g., to heat exchanger 202. The pump 411 may be powered by various means and in one embodiment from the collected heat.

FIGS. 5A-5D illustrate an exemplary embodiment of the collector assembly 201 featuring absorbers 204 having an alternative counter flow arrangement. As shown, absorbers 204 are cylindrical members having an outer transparent evacuated enclosure 401 (e.g., a glass tube). Located within the enclosure is a tubular absorber fin 403 (e.g., an extruded aluminum or copper pipe) which absorbs solar light incident through the enclosure 401 and transforms the light to heat. The absorber fin 403 may include a selective surface 405 which exhibits a high absorptivity to solar light and a low emissivity (thereby limiting radiative heat loss). For example, in some embodiments, the selective surface 405 may exhibit an absorptivity of 0.75 or more, 0.9 or more, 0.95 or more, 0.99 or more etc. (e.g., in the range of 0.9 to 0.99). For example, in some embodiments, the selective surface 405 may exhibit an emissivity of 0.25 or less, 0.10 or less, 0.05 or less, 0.025 or less etc. (e.g., in the range of 0.04 to 0.05). In some embodiments, the selective surface exhibits these absorptivity and emissivity properties at temperature of 100 C or greater, 150 C or greater, 175 C or greater, or 200 C or greater (e.g., in the range of 150-200 C). In some embodiments, the selective surface comprises an aluminum nitride coating, e.g., sputtered on to the outer (vacuum facing) surface of absorber fin 401. In other embodiments, any other suitable surface or coating known in the art may be used.

In contrast to the example shown in FIGS. 4A-4C, in the absorber of the current example absorber fin 403 is not disposed about an inner tube 407. Instead, a counter flow heat exchange pipe 501 runs along and is in thermal contact with the inner surface of the absorber fin 403. The heat exchange pipe 501 includes an outer tube 502 closed at one end and disposed about an inner tube 503. Heat transfer working fluid flows into the inner tube 503 to the end of the pipe 501. The heat transfer fluid returns through the annular space between the inner tube 503 and the outer tube 502. As the fluid passes through the absorber 204, the fluid absorbs heat from the absorber fin 403 and carries the heat away from the absorber 204. That is, the fluid enters the absorber at a first temperature, is heated during its passage, and is output at a second temperature higher than the first temperature. If the direction of flow is reversed, the heat exchange is still useful. Because of the high vacuum, the lowest resistance path for the heat is through the fluid.

Heat exchange pipe 501 may be, e.g., welded or otherwise joined to absorber fin 403. In some embodiments, one or more portions of heat pipe 501 and one or more potions of absorber fin 403 are formed as an integral unit. In another embodiment, the pipe 501 may be connected by a mechanical fastener.

Concentrator assembly 201 includes a plumbing system 409 which facilitates the flow of heat transfer fluid through the absorbers 204. A pump 411 pumps fluid along an input plumbing line 412 and into the absorbers 204. For example, pump 411 may pump the fluid with a mass flow rate of 40 g/s or more, 50 g/s or more, 60 g/s or more, 70 g/s or more, 80 g/s or more, e.g., in the range of 40-45 g/s. As described above, the fluid is heated during counter flow action in heat pipe 501. An output plumbing line 413 carries the heated fluid away from concentrator assembly 201, e.g., to heat exchanger 202.

FIGS. 6A-6E illustrate an exemplary embodiment of collector assembly 201 featuring absorbers 204 having a so called U-tube flow arrangement. As shown, absorbers 204 are cylindrical members having an outer transparent evacuated enclosure 401 (e.g., a glass tube). Located within the enclosure is a tubular absorber fin 403 (e.g., an extruded aluminum or copper pipe) which absorbs solar light incident through the enclosure 401 and transforms the light to heat. The absorber fin 401 may include a selective surface 405 which exhibits a high absorptivity to solar light and a low emissivity (thereby limiting radiative heat loss). For example, in some embodiments, the selective surface 405 may exhibit an absorptivity of 0.75 or more, 0.9 or more, 0.95 or more, 0.99 or more etc. (e.g., in the range of 0.9 to 0.99). For example, in some embodiments, the selective surface 405 may exhibit an emissivity of 0.25 or less, 0.10 or less, 0.05 or less, 0.025 or less etc. (e.g., in the range of 0.04 to 0.05). In some embodiments, the selective surface exhibits these absorptivity and emissivity properties at temperature of 100 C or greater, 150 C or greater, 175 C or greater, or 200 C or greater (e.g., in the range of 150-200 C). In some embodiments, the selective surface comprises an aluminum nitride coating, e.g., sputtered on to the outer (vacuum facing) surface of absorber fin 401. In other embodiments, any other suitable surface or coating known in the art may be used.

In contrast to the example shown in FIGS. 4A-4C and FIGS. 5A-4C, in the absorber of the current example absorber fin 403 is not disposed about an inner tube 407 and does not include a counter-flow heat exchange pipe 501. Instead, a U-shaped tube 601 runs along and is in thermal contact with the inner surface of the absorber fin 403. Heat transfer working fluid flows into the U-shaped tube 601 through an input at a proximal end of the absorber 204. The fluid flows down an input portion of the tube to a distal end of absorber 204. The end of the U-shaped tube 601 includes a curve portion which directs the fluid back through an output portion of the tube to an output located at the proximal end of the absorber 204.

As the fluid passes through the absorber 204, the fluid absorbs heat from the absorber fin 403 and carries the heat away from the absorber 204. That is, the fluid enters the absorber at a first temperature, is heated during its passage, and is output at a second temperature higher than the first temperature. Note that the input portion and output portion of the U-shaped tube 601 are spaced apart from each other. Preferably, the spacing is optimized. Advantageously, the arrangement reduces or eliminates heat flow from the warmer fluid exiting the tube to the cooler fluid entering the tube. Accordingly, the efficiency of the heat exchange between the absorber 204 and the heat exchange working fluid is increased, e.g., in comparison to flow configurations featuring a counter-flow type arrangement.

U-shaped tube 601 may be, e.g., welded or otherwise joined to absorber fin 403. In some embodiments, one or more portions of U-shaped tube 601 and one or more portions absorber fin 403 are formed as an integral unit, e.g., an integral unit of extruded metal (e.g., aluminum or copper).

Concentrator assembly 201 includes a plumbing system 409 which facilitates the flow of heat transfer fluid through the absorbers 204. A pump 411 pumps fluid along an input plumbing line 412 and into the absorbers 204. For example, pump 411 may pump the fluid with a mass flow rate of 40 g/s or more, 50 g/s or more, 60 g/s or more, 70 g/s or more, 80 g/s or more, e.g., in the range of 40-45 g/s. As described above, the fluid is heated during passage through the U-shaped tube 601. An output plumbing line 413 carries the heated fluid away from concentrator assembly 201, e.g., to heat exchanger 202.

Although the embodiments shown above feature a direct flow plumbing configuration, it is to be understood that other plumbing configurations known in the art may be used. For example, in some plumbing configurations, pump 411 is omitted, and the flow of the heat transfer working fluid is driven, e.g., by gravity or thermal convection.

Figure 7A:
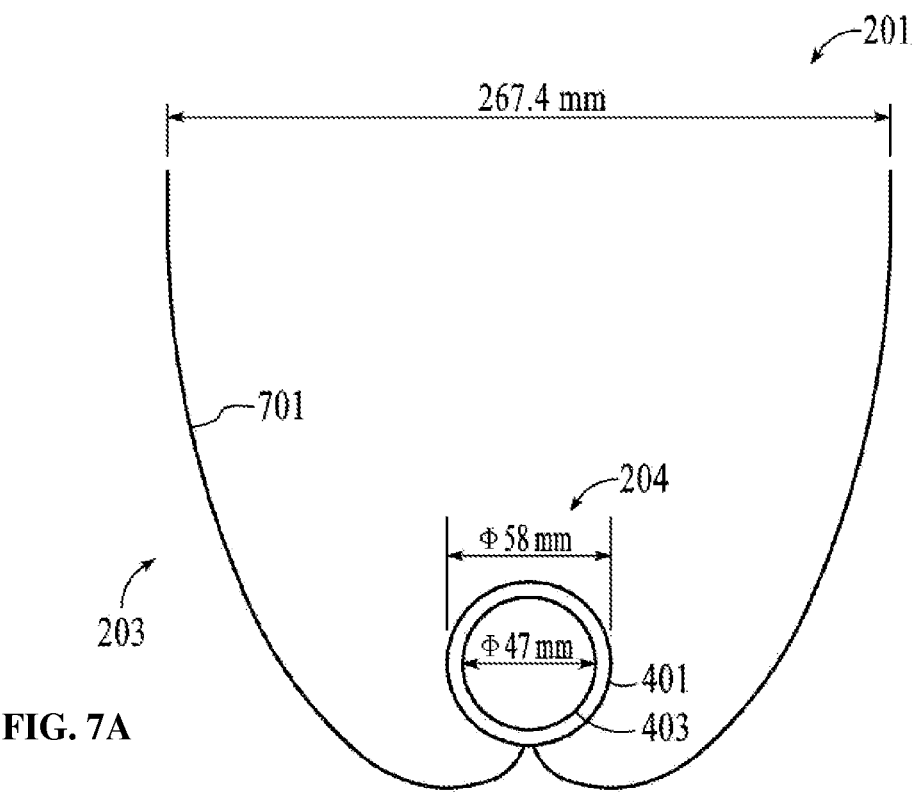
FIG. 7A is an illustration of a cross-section of a concentrator assembly of a first embodiment.
Figure 7B:
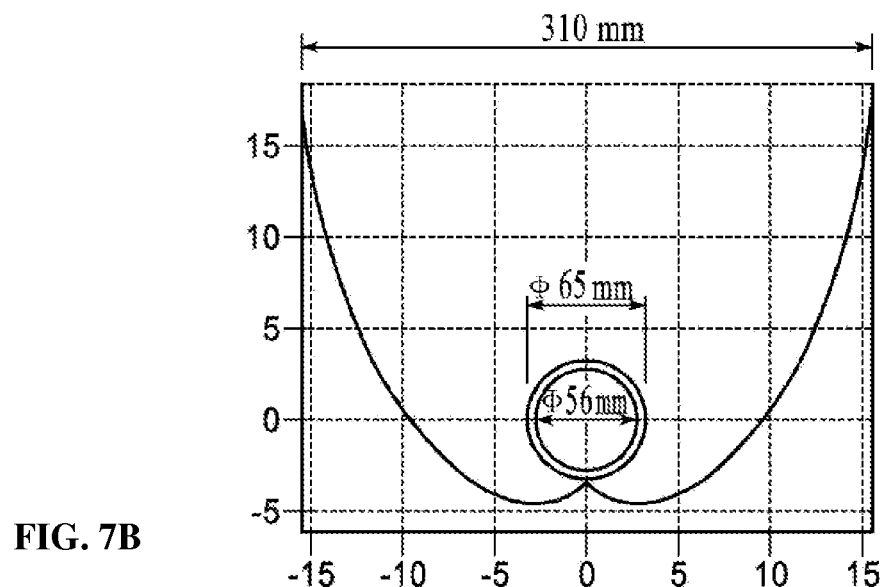
FIG. 7B is an illustration of a cross-section of a concentrator assembly of a second embodiment.
Figure 8A:
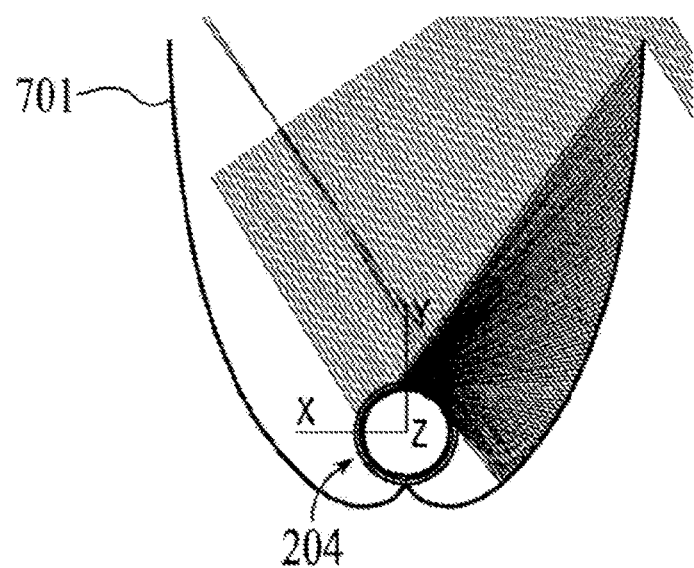
FIGS. 8A-8E are ray traces of the concentrator assembly of FIG. 7 for rays incident at a variety of angles ranging from −35 degrees to +35 degrees.
Figure 8B:
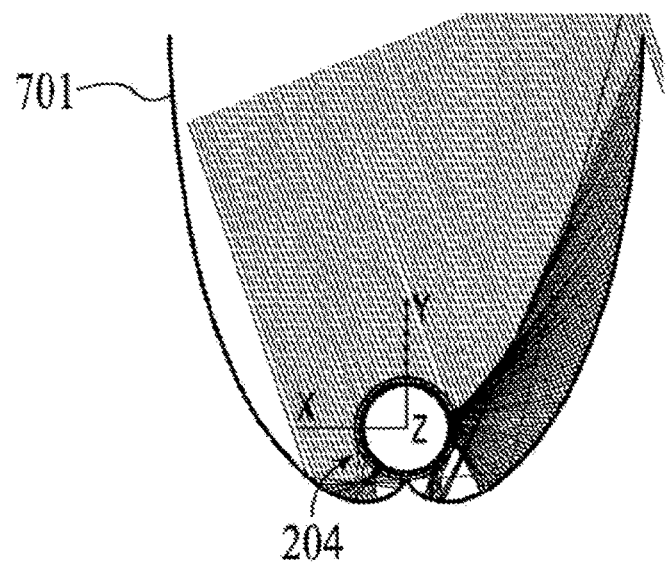
Figure 8C:
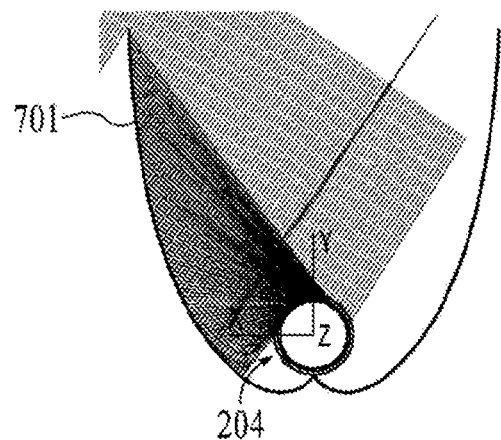
Figure 8D:
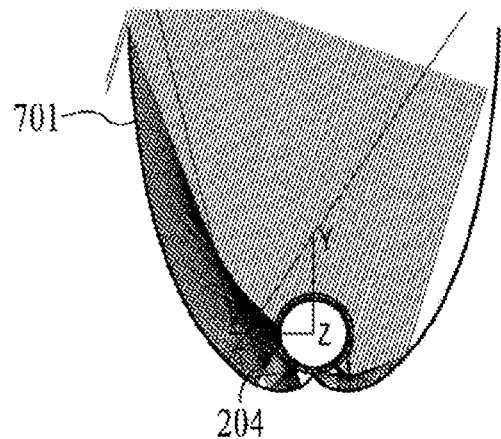
Figure 8E:
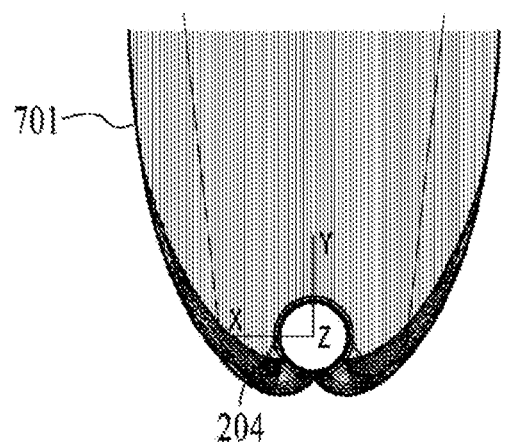

FIG. 7A illustrates a cross-section of a concentrator assembly 201 of a first embodiment. The concentrator assembly 201 illustrated in FIG. 7A shows a cross section of a trough shaped reflective surface 701 of concentrator 203 designed for the absorber fin of FIG. 4. FIG. 7B illustrates a cross-section of a concentrator assembly 201 of a second embodiment. The concentrator assembly 201 illustrated in FIG. 7B shows a cross section of a trough shaped reflective surface 701 of concentrator 203 may be designed for the absorber fin of FIGS. 5 and 6. The reflective surface 701 illustrated in FIGS. 7A and 7B extends in and out of the plane of the page along a longitudinal axis. Cylindrical absorber 204 is located at the bottom of the trough and also extends along the direction of the longitudinal axis. The top of the trough forms an input aperture. The reflective surface is shaped such that substantially all light rays incident on the input aperture at angles less than an acceptance angle are directed to a surface of absorber 204 (e.g., the surface of a cylindrical absorber fin 403 of absorber 204). FIGS. 8A-8E are ray traces of the reflector surface 701 of FIG. 7A, which illustrate the concentration of light at angles less than an acceptance angle of 34 degrees. The ray traces of the reflector surface 701 of a different shape, for example the reflector surface illustrated in FIG. 7B, would be very similar.

Figure 9A:
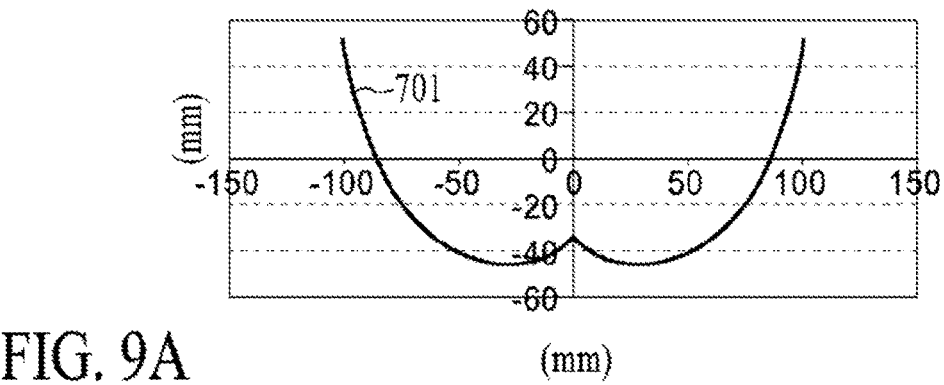
FIGS. 9A-9B are illustrations of exemplary reflective surfaces for a concentrator assembly.
Figure 9B:
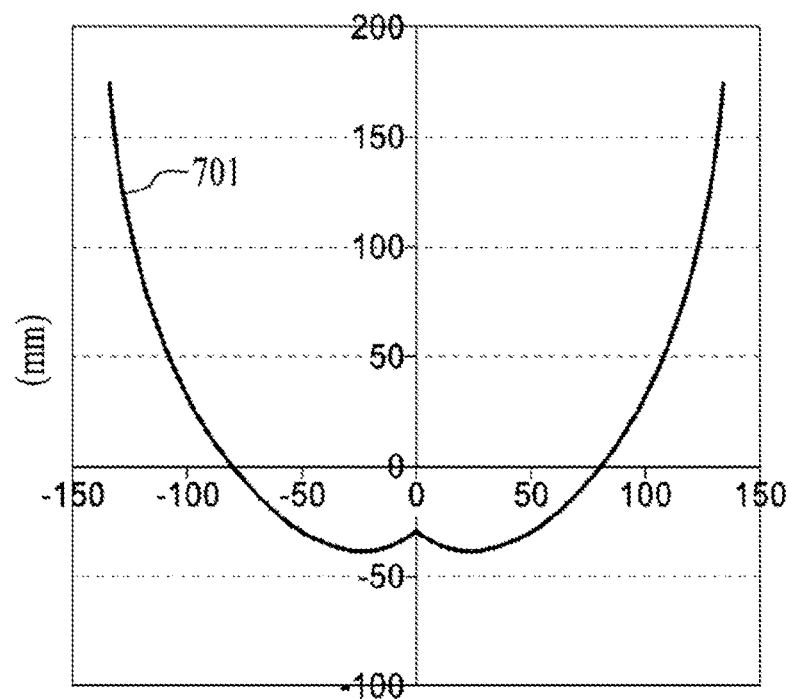

The acceptance angle can be designed according to the desired concentration factor, the concentrated flux profile and the orientation of the absorber tubes (East-West or North-South, horizontal or tilted, etc.). In one embodiment, the tilt may be determined based on a location of system. Orienting the absorber tubes North-South (N-S) requires larger acceptance angles to ensure sufficient illumination throughout the day, which reduces the concentration factor. Therefore, an East-West (E-W) orientation is generally advantageous. However, a N-S oriented reflector (with the larger acceptance angle) does accept more diffuse solar irradiation and so too has some positive performance attributes. Additionally, reflectors with larger acceptance angles will generally require less reflector area, which provides an economic advantage. FIGS. 9A and 9B show exemplary shapes for the reflective surface 701. In FIG. 9A the surface 701 has been optimized for use with a concentrator 204 oriented in the N-S direction and has an acceptance angle of 60 degrees. In FIG. 9B the surface 701 has been optimized for use with a concentrator 204 oriented in the E-W direction, with an acceptance angle of 34 degrees.

Figure 10A:
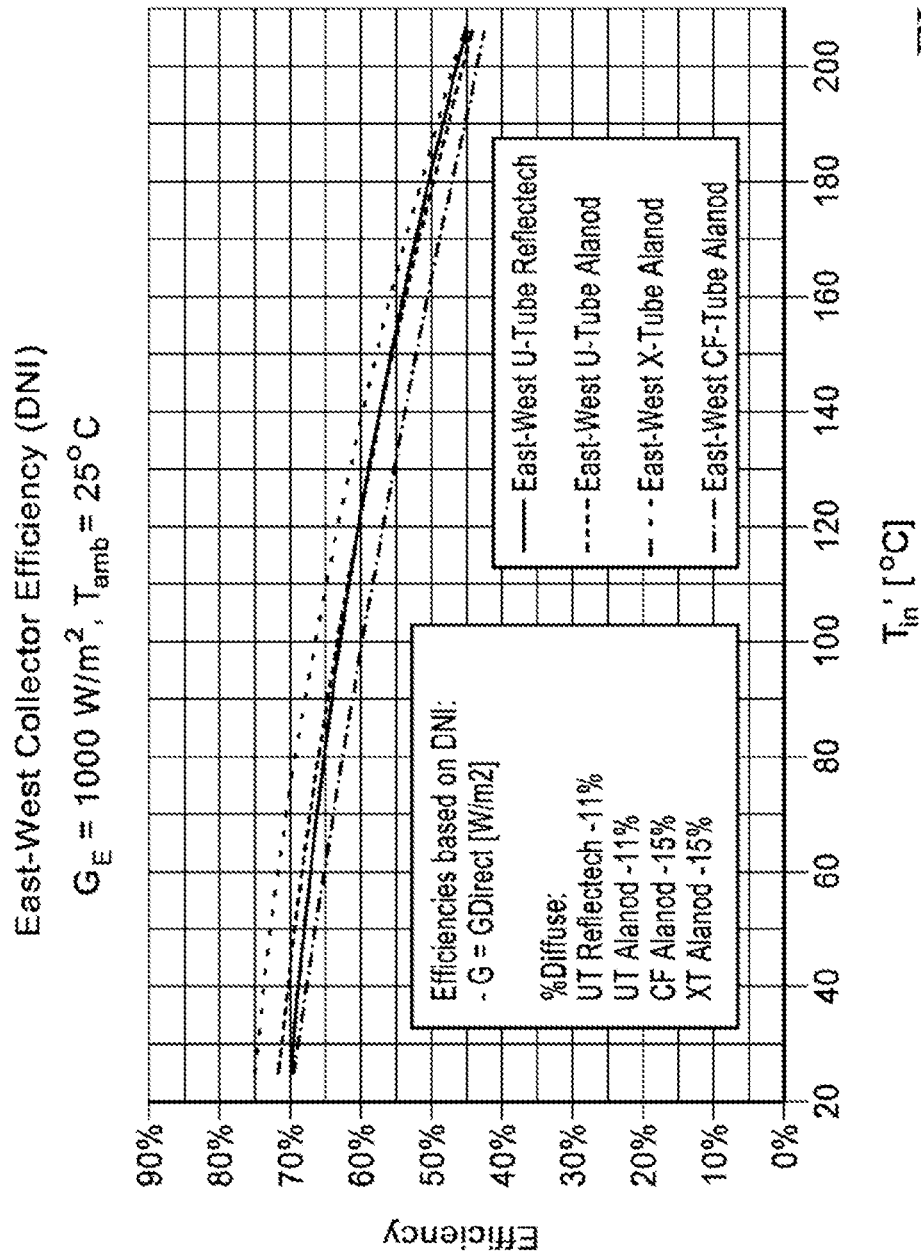
FIGS. 10A-10B show plots of collector efficiency versus inlet temperature under a variety of conditions.
Figure 10B:
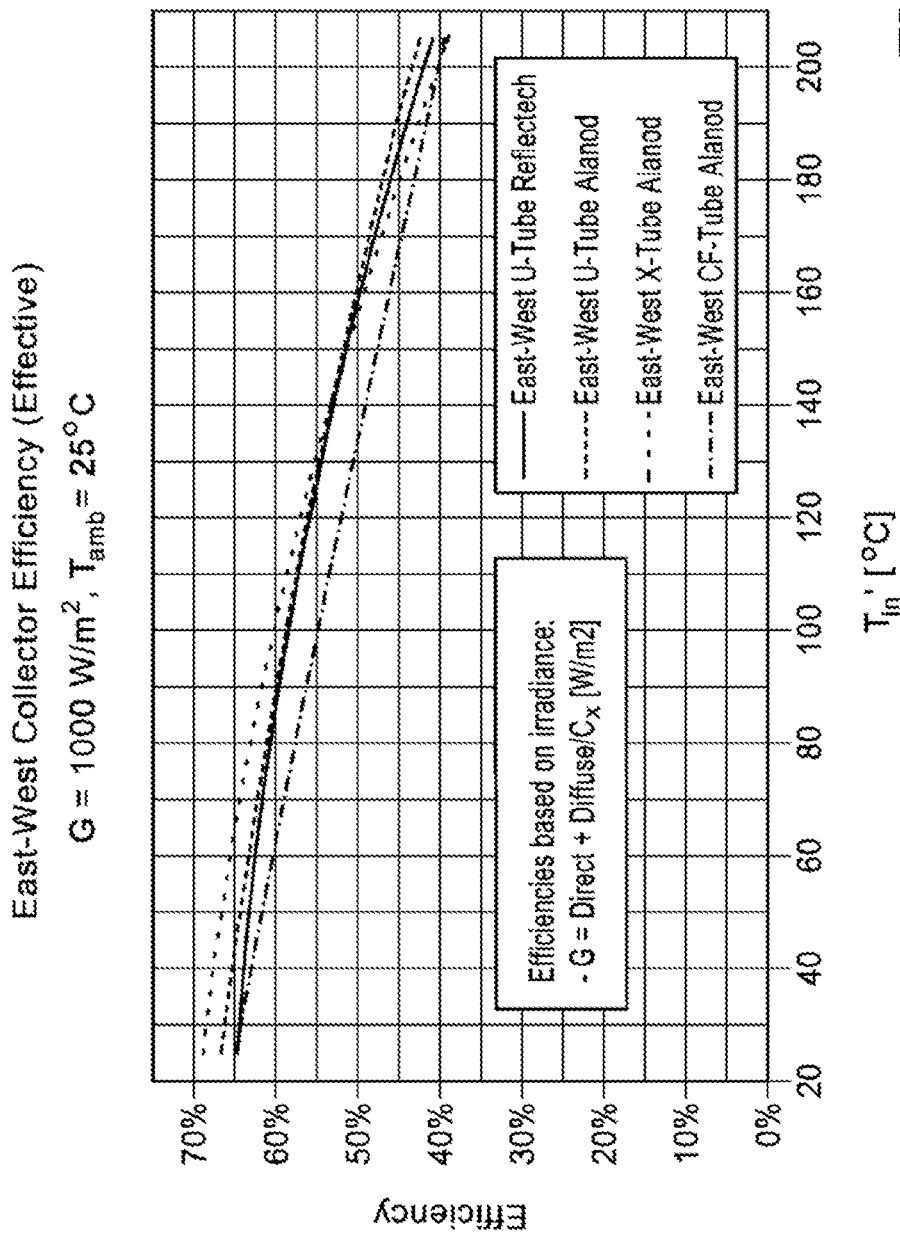

FIGS. 10A-10B illustrate plots of collector efficiency versus heat exchange fluid intake temperature for concentrator assemblies 201 in various configurations. The collector efficiency is defined as the ratio of the useful power extracted from the collector divided by the product of the collected irradiance and the effective aperture area of the collector (defined as the length of the active area of the absorber tube 204, which is the area covered by the selective coating 405, times the width of the reflector). Various collector efficiencies may change depending on one or more parameters and the plot forms no limitations to the present disclosure.

Plots are shown for concentrator assemblies with absorbers 204 in the U-Tube (e.g., as shown in FIGS. 6A-6E), X-Tube (the X-tube has similar heat exchange properties to the counter flow tube), and counter flow (CF) (e.g., as shown in FIGS. 5A-5D) configurations. In each case, the concentrator assemblies are in the E-W arrangement. The type of reflective surface used is indicated (i.e. 92% reflectivity material available from Alanod or 94% reflectivity material available from ReflecTech). In each case the ambient temperature is 25 C, and the incident solar irradiance is G=1000 W/m$^2$. FIG. 10A shows efficiencies based on direct normal incidence (DNI). FIG. 10B shows efficiencies based on effective irradiance (i.e., the direct irradiance plus the diffuse irradiance divided by the concentration ratio of the concentrator assembly).

Referring to FIGS. 10A and 10B, at an inlet temperature of 200 C, the U-Tube configuration (with ReflecTech and Alanod reflective surfaces) provides the highest collector efficiency of about 45% or more. At an inlet temperature of 200 C, the X-Tube and CF configurations provide similar collector efficiency in comparison to each other, but inferior efficiency compared to the U-Tube configuration. However, for inlet temperatures in the range of 40 C to 140 C, the X-Tube configuration provides the best performance of any configuration.

Figure 11A:
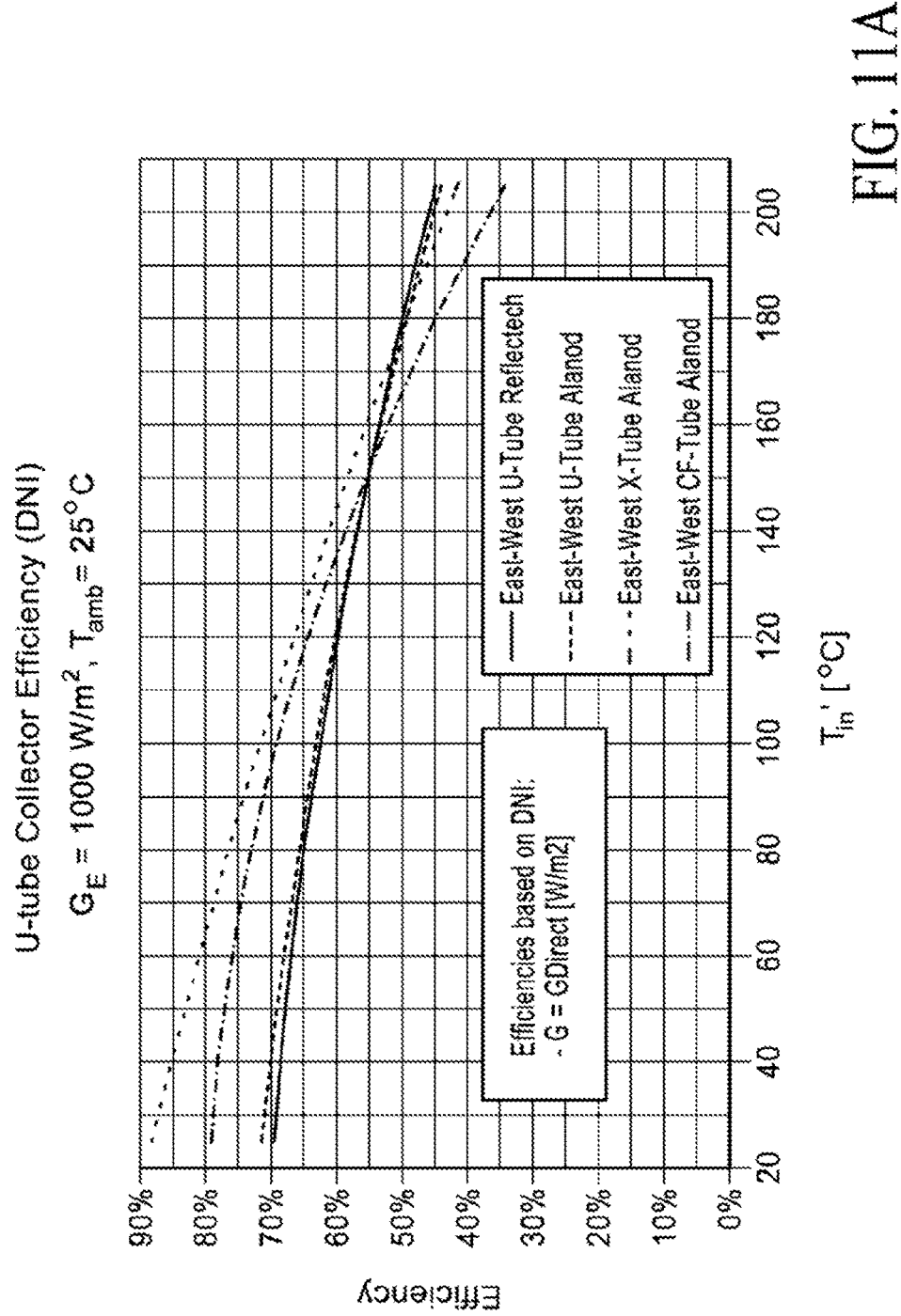
FIGS. 11A-11B show plots of collector efficiency versus inlet temperature under a variety of conditions.
Figure 11B:
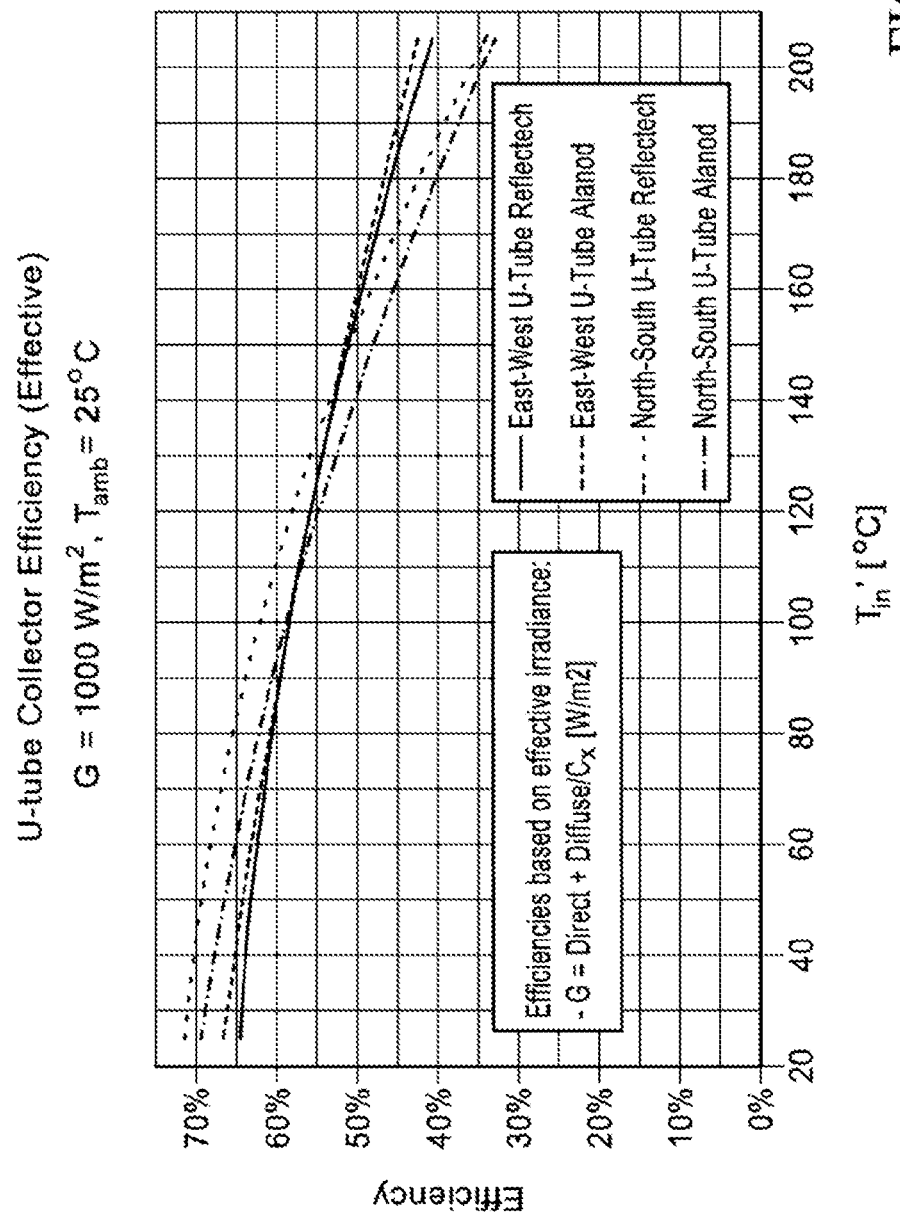

FIGS. 11A and 11B are plots of collector efficiency versus heat exchange fluid intake temperature for concentrator assemblies 201 in various configurations. The collector efficiency is defined as the ratio of the useful power extracted from the collector divided by the product of the collected irradiance and the effective aperture area of the collector (defined as the length of the active area of the absorber tube 204, which is the area covered by the selective coating 405, times the width of the reflector).

Plots are shown for concentrator assemblies with absorbers 204 in the U-Tube (e.g., as shown in FIGS. 6A-6E) configuration for both E-W and N-S arrangement. The type of reflective surface used is indicated (i.e. 92% reflectivity material available from Alanod or 94% reflectivity material available from ReflecTech). In each case the ambient temperature is 25 C, and the incident solar irradiance is G=1000 W/m$^2$. FIG. 11A shows efficiencies based on direct normal incidence (DNI). FIG. 11B shows efficiencies based on effective irradiance (i.e., the direct irradiance plus the diffuse irradiance divided by the concentration ratio of the concentrator assembly).

Referring to FIGS. 11A and 11B, at an inlet temperature of 200 C, the U-Tube configuration (with ReflecTech and Alanod reflective surfaces) with E-W arrangement provides the highest collector efficiency of about 45% or more. At 200 C, the N-S arrangement provides inferior efficiency compared to E-W. However, for inlet temperatures in the range of 40 C to 140 C, the N-S arrangement provides better performance than the E-W arrangement.

Figure 11C:
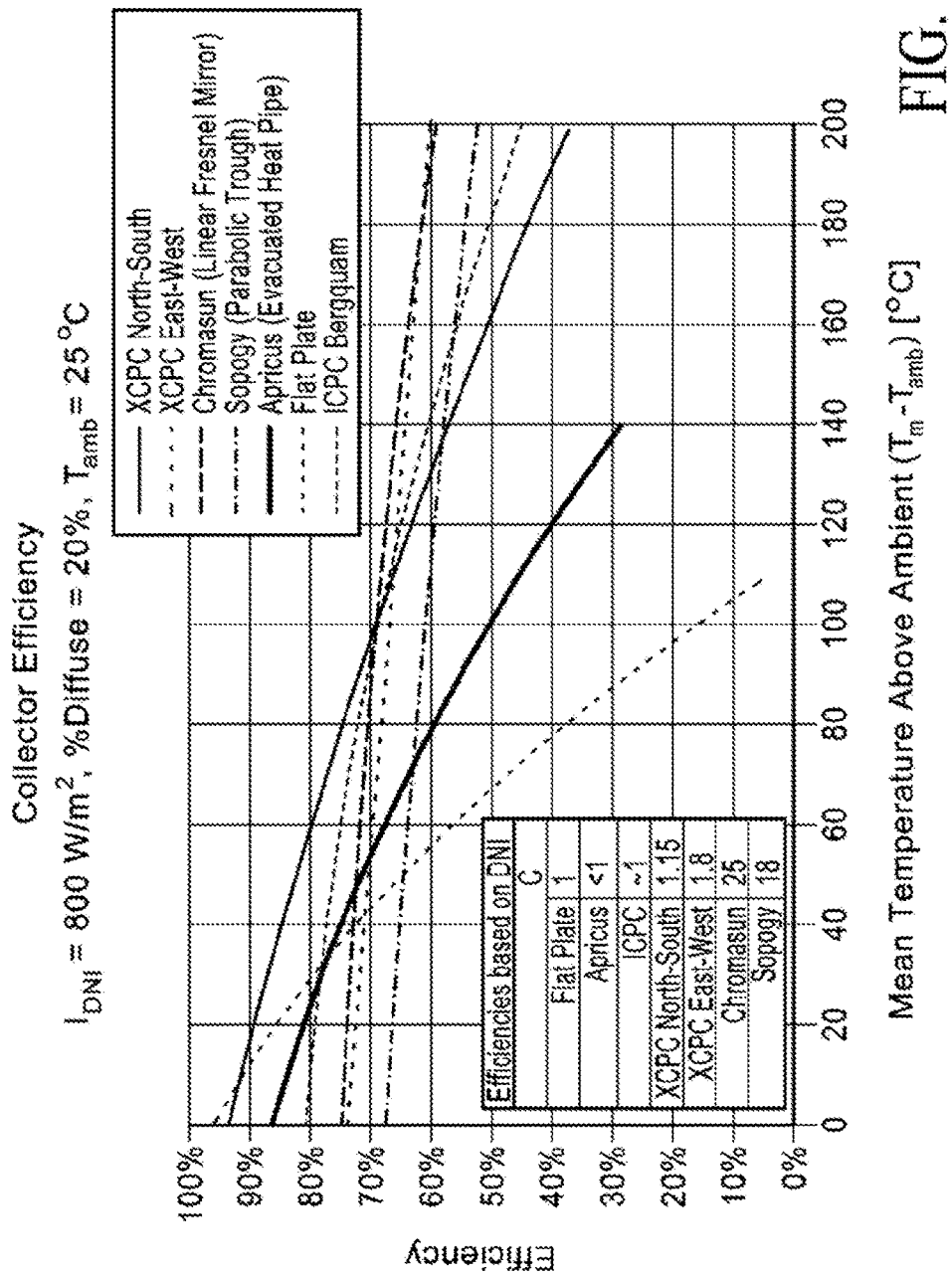
FIG. 11C shows a plot of collector efficiency versus inlet temperature under a variety of conditions for several types of collectors.

FIG. 11C shows plots of collector efficiency versus operating temperature (mean temperature above ambient) for concentrator assemblies 201 in comparison to collector efficiencies of other types of collectors known in the art. The collector efficiency is defined as the ratio of the useful power extracted from the collector divided by the product of the collected DNI irradiance and the effective aperture area of the collector. In each case the ambient temperature is 25 C, and the incident solar irradiance is G=800 W/m$^2$. The concentration ratio for each collector type is indicated.

Plots are shown for concentrator assemblies with absorbers 204 in the U-Tube (e.g., as shown in FIGS. 6A-6E) configuration for both E-W and N-S arrangement. Plots are also shown for three non-tracking collectors: a flat plate solar collector, an Apricus evacuated heat pipe collector, and a Winston/Bergquam collector featuring an evacuated tube having an internally located non-imaging (compound parabolic concentrator) collector. Plots are also shown for two tracking collectors: a Chromasun linear Fresnel mirror collector and a Sopogy parabolic trough collector.

Referring to FIG. 11C, note that at temperatures near 200 C, the U-Tube E-W concentrator outperforms all other collectors (tracking or non-tracking). Further at temperatures in the range of 100-200 C, the U-Tube E-W and U-Tube N-S concentrators perform much better than the non-tracking flat plate and Apricus collectors, and comparable to or better than the remaining collectors.

Figure 12:
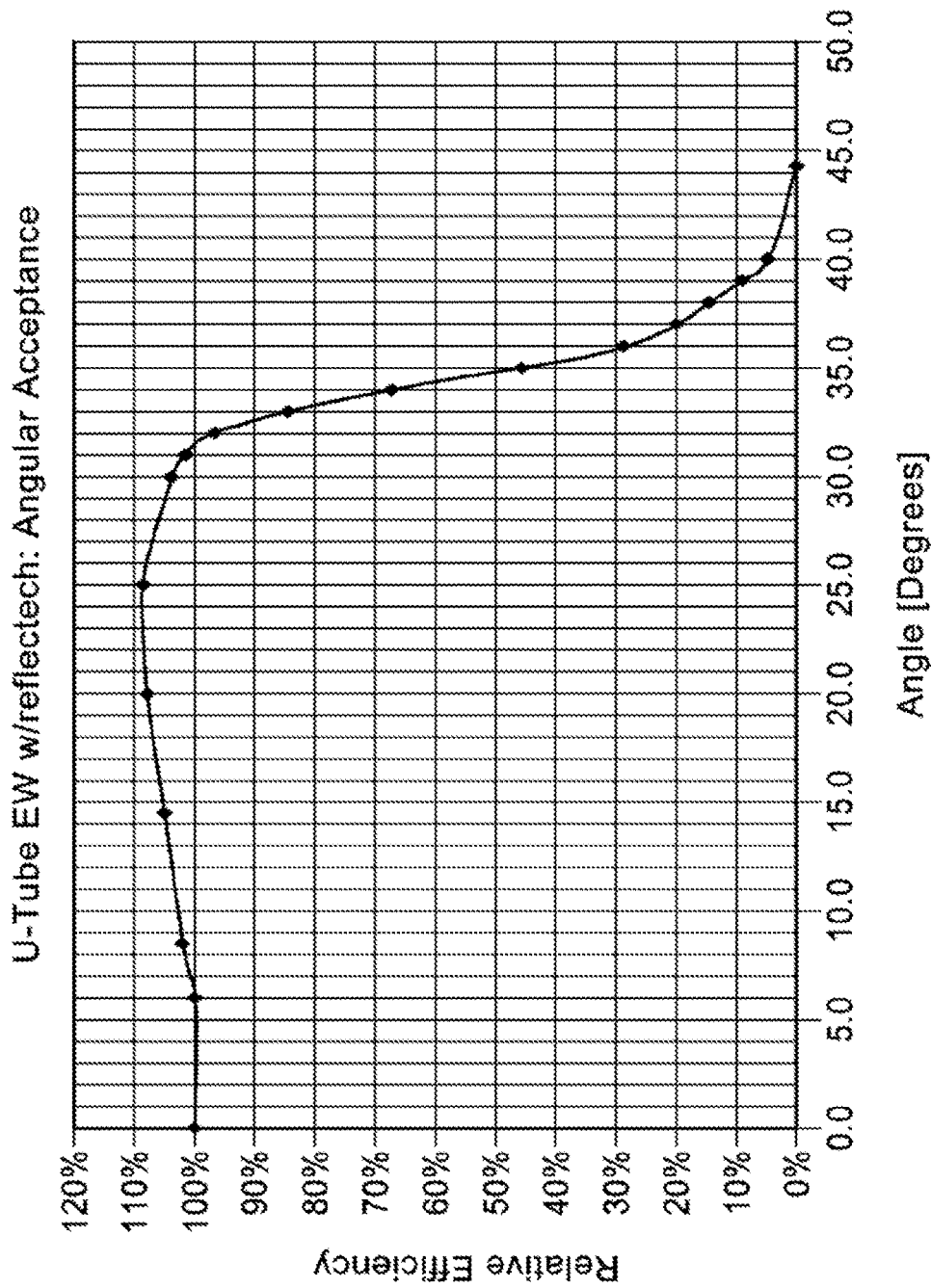
FIG. 12 is a plot of relative efficiency versus angle of incidence of solar light for an exemplary concentrator assembly.

FIG. 12 shows a plot of the relative efficiency of a collector featuring an E-W oriented absorber in the U-tube configuration as a function of the angle of incident solar radiation. Note that the relative efficiency is substantially constant at about 100% over angles less than the 35 degree acceptance angle of the concentrator 203 designed for E-W.

In the examples described above, it is advantageous if the reflective surface 701 of the concentrators 203 has a shape which ensures that all or substantially all (e.g., in the absence of losses such as those due to imperfect reflectivity) light rays incident on the concentrator 203 at angles less than an acceptance angle are concentrated to an absorber. This condition provides for efficient use of the absorber 204, which, in many applications is a costly component, e.g., with a cost that increases with size.

In some embodiments, the shape of the reflective surface 701 may be determined by considering the active surface of absorber 204 (e.g., selective surface 405) to be a light emitting surface and requiring that the reflective surface 701 be shaped such that no light rays emanating from the surface of absorber 204 return to the absorber 204. In the terminology of radiation transfer, the view factor from absorber back to itself is zero. It follows from energy conservation that light starting from the emitting surface will (after zero, one or more reflections) invariably reach the sky. The shape factor is one. Note, that in this discussion, it is understood that material losses, like imperfect reflectivity are not included. In one embodiment, the radiation shape factor from the desired phase space of the sky is also at maximum, the shape factor from desired phase space of sky to light emitting surface is also one. In special cases, both shape factors can be one, giving a class of non-imaging optical concentrators described. However, in most cases this is not practical and a compromise solution is sought. The following describes methods for ensuring the shape factor from the absorber is one, which is frequently the option. The following also describes techniques for obtaining improved or optimal designs which take into account practical considerations for real absorbers, e.g., concentrator/absorber gaps. For example, the shape may comprise involutes of a circle arc. For example, the shape may also comprise parabolic shape for the concentrator.

Figure 13:
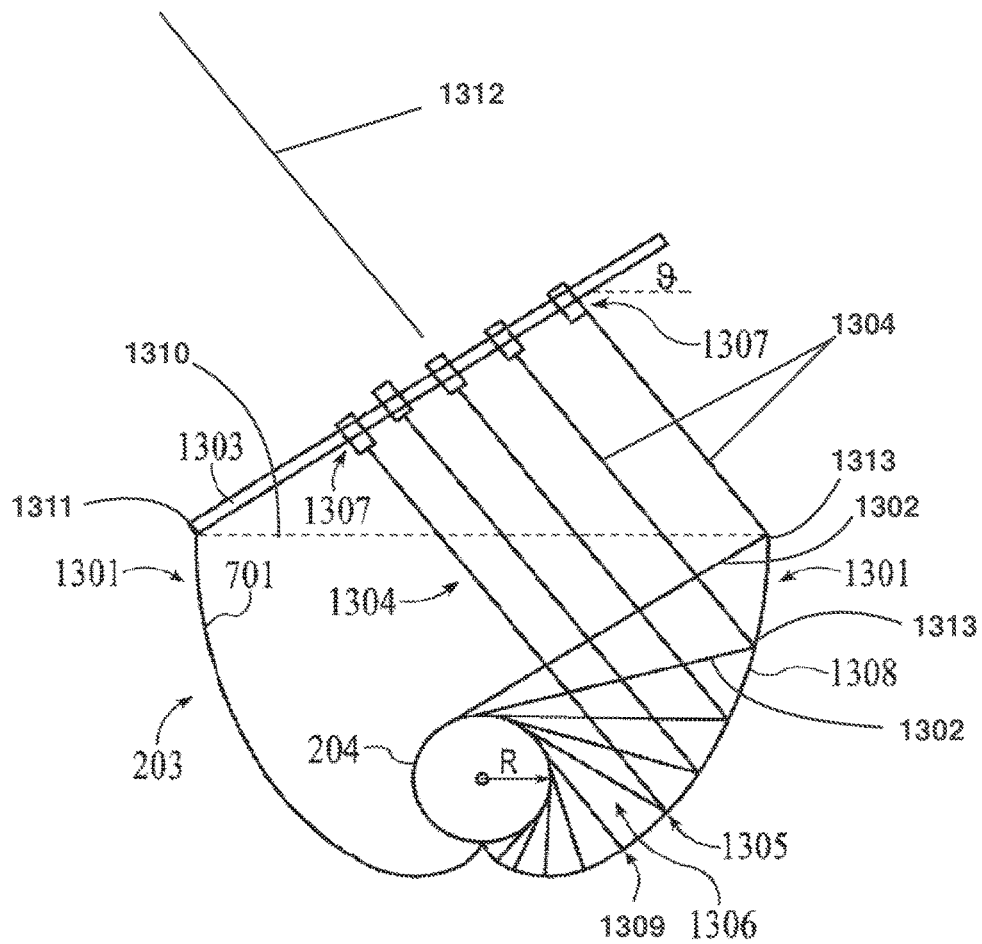
FIG. 13 is an illustration of a concentrator design method.

For example, FIG. 13 illustrates a method of designing a concentrator 203 for a cylindrical absorber 204 in which the shape factor from the absorber is one. Here, the active surface of the absorber is taken to be the outer surface of the cylinder. The reflective surface 701 of the concentrator 203 includes two symmetrically disposed edge ray involutes 1301 of the cylinder.

As used herein, an edge ray involute of an absorber is a curve 1301 determined using the following procedure. A taut string is considered to be wrapped around the absorber 204. While maintaining the string taut and holding its length constant, an end 1305 of the string is unwrapped until the string is tangent to the surface of the absorber 204. The path of the end of the string defines a first portion 1309 of the edge ray involute 1301. At this point, the edge ray involute is equivalent to the standard involute familiar from differential geometry (see, e.g., http://mathworld.wolfram.com/Involute.html).

Next, to define a second portion 1308 of the edge ray involute 1301, the string is extended to include a second line segment 1304 extending from the end of the first line segment 1302 to an end 1307 which normally intersects (i.e. intersects at right angles to) a line 1303. The edge line 1303 extends from an edge 1311 of the entrance aperture 1310 of the concentrator 203 at an angle corresponding to the acceptance angle of the concentrator 203. The edge line 1303 corresponds to the wave front of an edge ray of the concentrator 203 (i.e., the light ray 1312 incident with the maximum acceptance angle of the concentrator).

The extended string has the form of a taut string, which extends around a curve point 1313 placed at the end of the first line segment 1302 to the edge line 1303. The end 1307 of the string is allowed to slide frictionlessly along the edge line 1303 while maintaining the normal orientation of second line segment 1304 to the edge line 1303. Thus, as the end 1307 slides with the string kept taut, the position of the curve point 1313 is adjusted to maintain the normal orientation of second line segment 1304 to edge line 1303. The path of curve point 1313 continues to trace out the remaining portion of the edge ray involute.

As the slope of the involute defined by the movement of the curve point 1313 increase towards infinity, the process is stopped, and one half of the reflective surface 701 of concentrator 203 has been defined. The remainder of the surface may be obtained by reflection in the optic plane of the concentrator 203. Alternatively, the process may be ended before the slope approaches infinity to produce a truncated design (e.g., in cases where material costs, weight, or other considerations preclude full extension of the reflective surface).

Figure 4D:
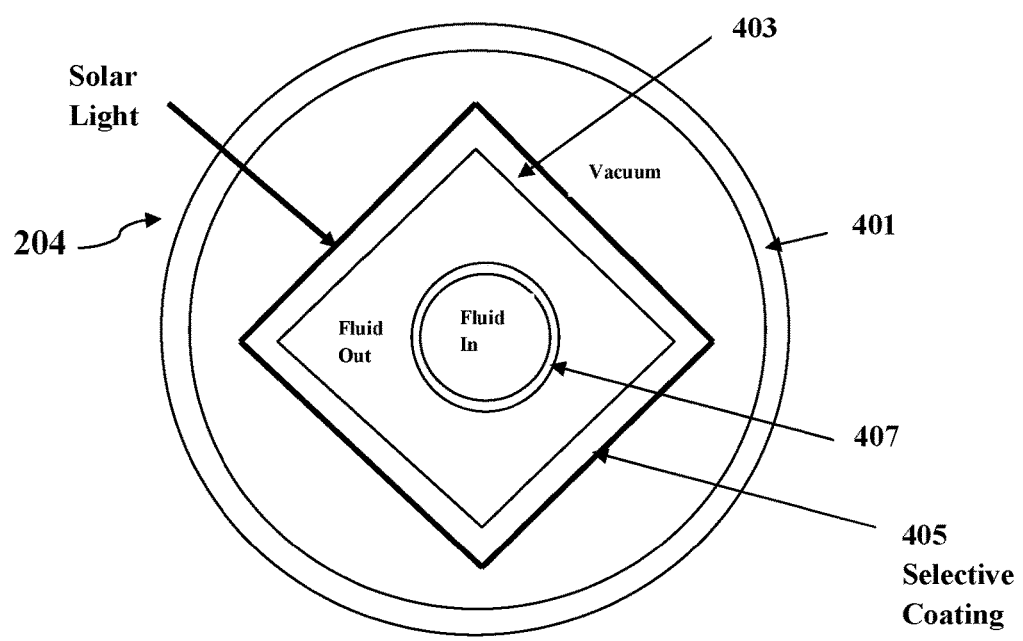
FIG. 4D illustrates an absorber used in the concentrator assembly of FIGS. 4A-4B, where the absorber has a cross section of a square.
Figure 5C:
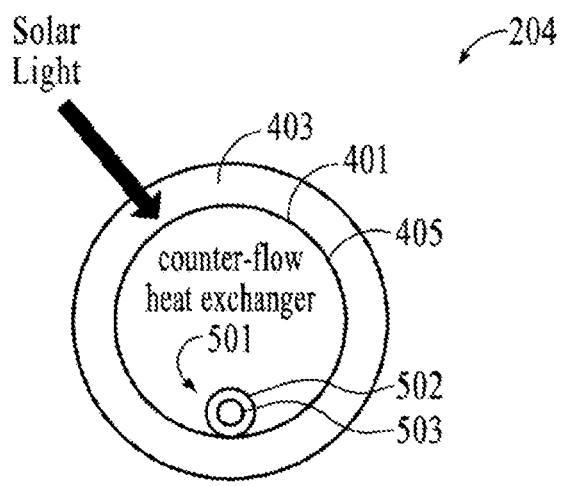
FIG. 5C is a cross section taken transverse the longitudinal axis of an absorber used in the concentrator assembly of FIGS. 5A-5B.
Figure 5D:
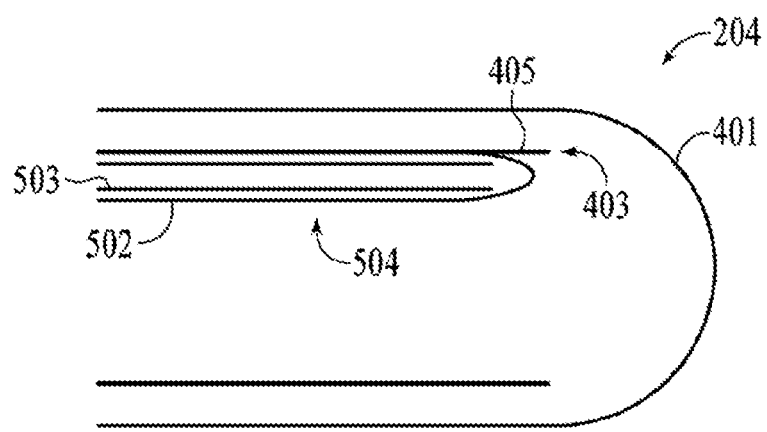
FIG. 5D is a cross section taken through the longitudinal axis of an absorber used in the concentrator assembly of FIGS. 5A-5B.
Figure 6C:
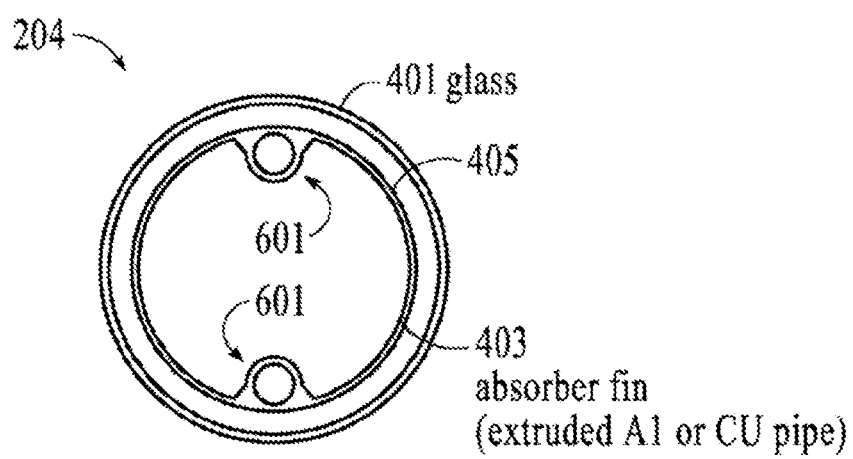
FIG. 6C is a cross section taken transverse the longitudinal axis of an absorber used in the concentrator assembly of FIGS. 6A-6B.
Figure 6D:
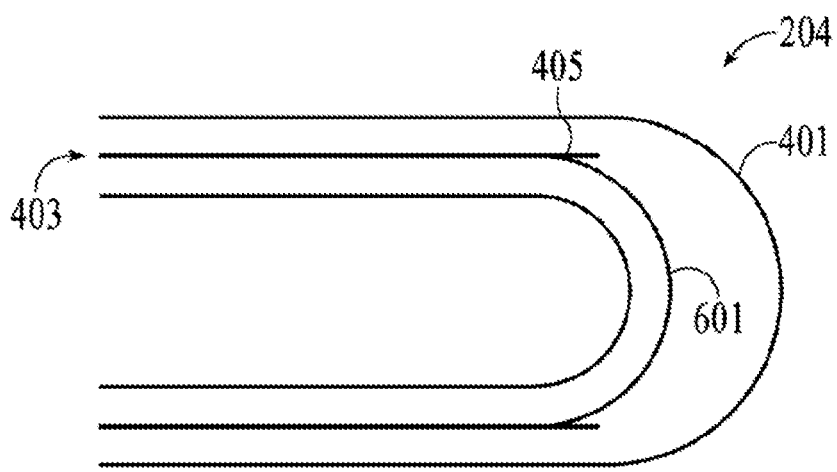
FIG. 6D is a cross section taken through the longitudinal axis of an absorber used in the concentrator assembly of FIGS. 6A-6B.
Figure 6E:
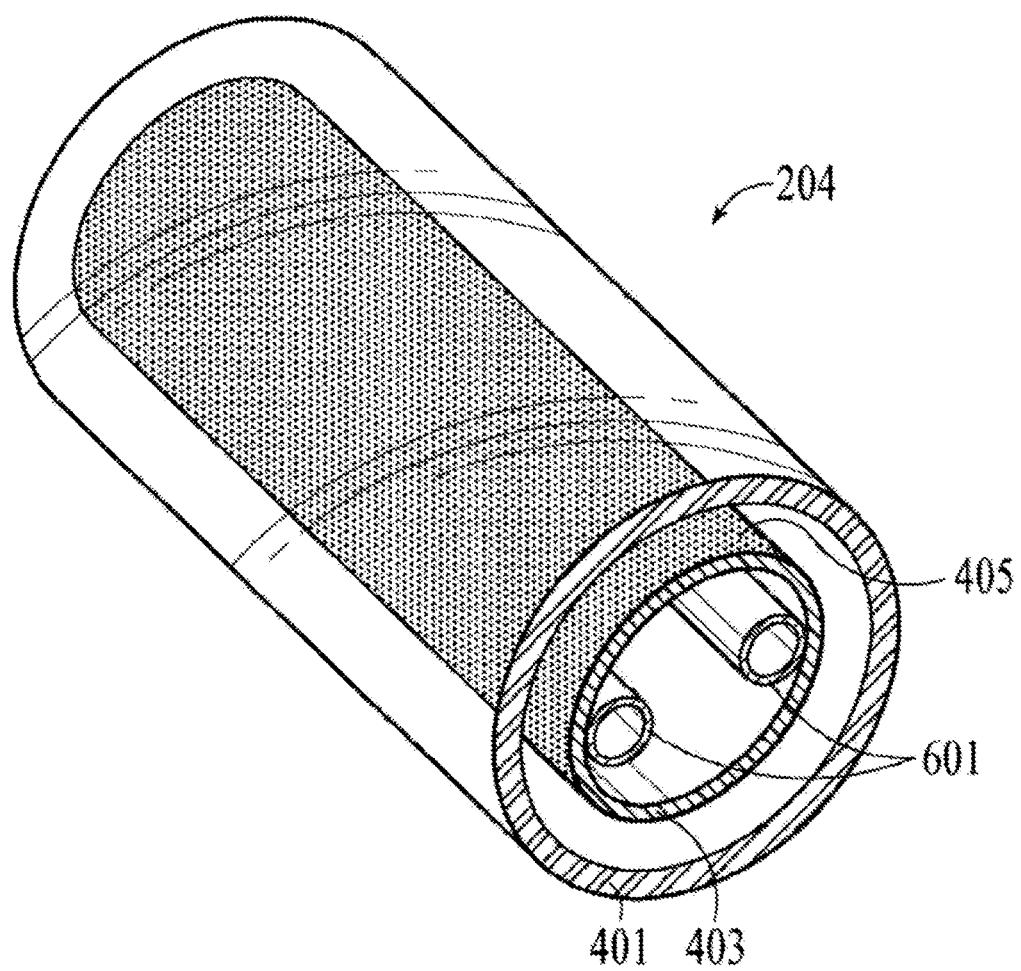
FIG. 6E is a perspective view of an absorber used in the concentrator assembly of FIGS. 6A-6B.

Not wishing to be bound by theory, using the framework of the Hottel string method familiar from thermodynamics (see, e.g., Hoyt C. Hottel, Radiant-Heat Transmission 1954, Chapter 4 in William H. McAdams (ed.), Heat Transmission, 3rd ed. McGraw-Hill), which is herein incorporated by reference in its entirety, it can be shown that the above described string-based design method will result in a concentrator design which operates at the thermodynamic limit. As will be apparent to one skilled in the art, the method may be easily adapted to absorbers having other cross sectional shapes, including square shapes, round shapes, irregular shapes, etc. Further, the design method may be used, in some cases, for example flat absorbers to obtain three dimensional concentrators by rotation of the two dimensional solution about the optic axis. FIG. 4D illustrates an exemplary embodiment of an absorber with an outer transparent evacuated enclosure and inner absorber fin with a cross-section of a square. The absorber illustrated in FIG. 4D may be used in the concentrator assembly of FIGS. 4A-4B.

The design method described above may be implemented as software on a computer. The output of the design method software may be, e.g., a data file, an image, a print out, etc. The output of the design method software may control one or more automated fabrication tools to fabricate a concentrator. The designs may be evaluated and/or optimized using optical design tools, e.g., including ray tracing applications and other optical design applications know in the art.

The string method described above will necessarily result in a design where the active surface of the absorber 204 is in contact with the reflective surface 701 of the concentrator 203 at one or more points. In practice, it may be impossible to meet this condition. For example, as described above, the active surface of an absorber 204 may be a selective surface 405 located within an evacuated enclosure 401. The presence of the enclosure 401 requires a gap between the selective surface 405 and the reflective surface 701 of the concentrator 203. Such a gap will result in a design which does not operate at the thermodynamic limit (i.e., the shape factor from the active surface of the absorber 204 may be less than one or some light incident on the concentrator may miss the absorber).

The following presents techniques for providing advantageous concentrator designs which take into account an absorber/concentrator gap. Consider a linear (2-D) non-imaging concentrator. In the absence of dielectric materials (no refraction) the angular acceptance is an ellipse in direction cosines with semi axes $\sin(\theta_0)$ and 1. For the current model, this phase space ellipse is considered uniformly populated in a Lambertian sense. Then the maximum flux concentration $C_o$ is $1/\sin(\theta_0)$ and the maximum irradiance on the absorber is $I_0/\sin(\theta_0)$ (all material losses, etc are neglected). $I_0$ is the irradiance on the aperture.

As noted above, idealized designs have no geometrical losses, the reflectors touch the absorber, one simply chooses $C \sim C_0$ (or less, e.g., to save material via truncation) and the design is determined. But in a practical design, the reflector cannot touch the absorber (resulting in a gap) and C is not necessarily $\sim C_0$, it can be smaller or larger. The following describes a method of making design choices which result in an advantageous concentrator design even in the presence of a concentrator/absorber gap.

Solar collector performance can be modeled as:

$$Q_{out} = \eta_0 Q_{in} - Q_{loss}$$

where $\eta_0$ is the optical efficiency, $Q_{in}$ is the insolation (I) multiplied by the aperture area (A) and $Q_{loss}$ is a function of T (absorber temperature), $T_A$ (ambient temperature) and perhaps some other factors. For evacuated receivers, $Q_{loss}$ is to an excellent approximation $A_{abs} \varepsilon\sigma(T^4 - T_A^4)$ where $A_{abs}$ is the absorber area, c is the emissivity and $\sigma = 5.67 \times 10^{-8}$ in MKS units. Then the operating efficiency $$\eta = Q_{out}/Q_{in} = \eta_0 - Q_{loss}/Q_{in} = \eta_0 - [A_{abs}/A]f(T,T_A)/I$$

Since $A/A_{abs} = C$, the geometrical concentration $$\eta = \eta_0 - [1/C]f(T,T_A)/I.$$

Figure 14A:
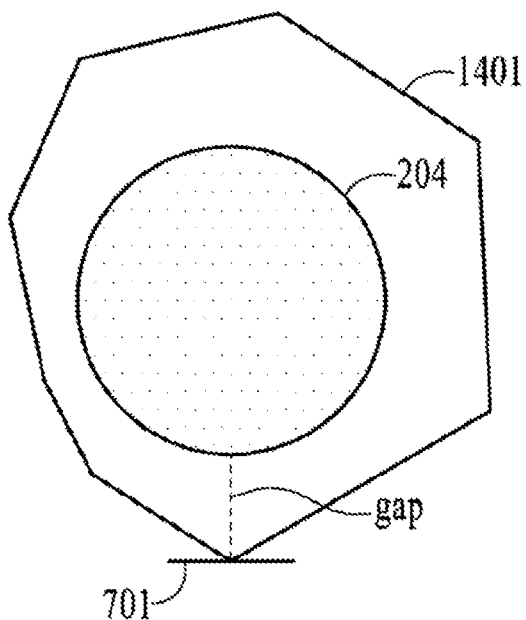
FIGS. 14A and 14B illustrate the use of virtual absorbers in a concentrator design method.

Accordingly, the design procedure involves maximizing $\eta$ by appropriately selecting $\eta_0$ and C. Several approaches are available for accommodating a gap between absorber and reflector. Referring to FIG. 14A, one approach is to surround the physical absorber 204 by a virtual absorber 1401 which contacts the reflective surface 701 of the concentrator 203. The virtual absorber 1401 has virtual absorber area $A'_{abs}$. Then $\eta_0$ rescales as $$\eta_0' = (A_{abs}/A'_{abs})\eta_0$$

as follows from reciprocity and the view factor from $A_{abs}$ to $A'_{abs}=1$. Designing for $$A'_{abs}/A=$$

$\sin(\theta)=1/C_0$ while $A_{abs}/A=1/C$ gives $$\eta=\eta_0 - [1/C]f(T,T_A)/I=$$

$$(A_{abs}/A'_{abs})\eta_0-(A_{abs}/A)f(T,TA)/I=$$

$$(C)\eta_0-(A_{abs}/A'_{abs})(A'_{abs}/A)f(T,T_A)/I=$$

$$(A_{abs}/A'_{abs})\eta_0-(A_{abs}/A'_{abs})(1/C)f(T,T_A)/I=$$

$$(A_{abs}/A'_{abs})[\eta_0-(\sin(\theta)f(T,T_A)/I].$$

Note C has been replaced by $1/\sin(\theta)$. Note that, in practice there is usually some truncation to save reflector material, so C may be less.

Figure 14B:
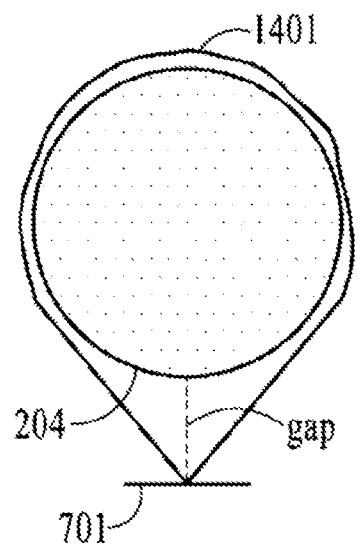

Accordingly, a reflector design may be optimized by making $A'_{abs}/A_{abs}$ approach 1, e.g., as shown in FIG. 14B. Once this optimum virtual absorber shape has been determined, the shape of the concentrator may be obtained, e.g., using the string method described above with the virtual absorber 1401 in place of the actual absorber 204.

Note that $$Q_{out}=A\eta=(CA_{abs})[\eta_0-(\sin(\theta)f(T,T_A)/I]=$$

$$[A_{abs}/\sin(\theta)][\eta_0-(\sin(\theta)f(T,T_A)/I]$$

is independent of $A'_{abs}$. That is, the absorber has the maximum irradiance allowed by thermodynamics (second law). For additional background on the use of virtual absorbers in concentrator design, see R. Winston, Ideal Flux Concentrators with Reflector Gaps, Applied Optics 17, 1668 (1978), which is incorporated by reference in its entirety.

Another approach to dealing with a concentrator/absorber gap is to immerse the absorber in a cavity. See, e.g., R. Winston, Cavity Enhancement by Controlled Directional Scattering, Appl. Opt. 19, 195 (1980), which is incorporated by reference in its entirety.

In this case $\eta_0$ is essentially unchanged, but C is significantly reduced. This gives $\eta=\eta_0 -[1/C]f(T, T_A)/I$ and there is the possibility of trading off $\eta_0$ against C. In other words, one can only partially immerse the absorber in the cavity, thereby incurring some loss, but restore some of the lost C in the concentrator design. This tradeoff is temperature dependent; and typically it is more advantageous to increase C when the temperature is high.

Figure 16:
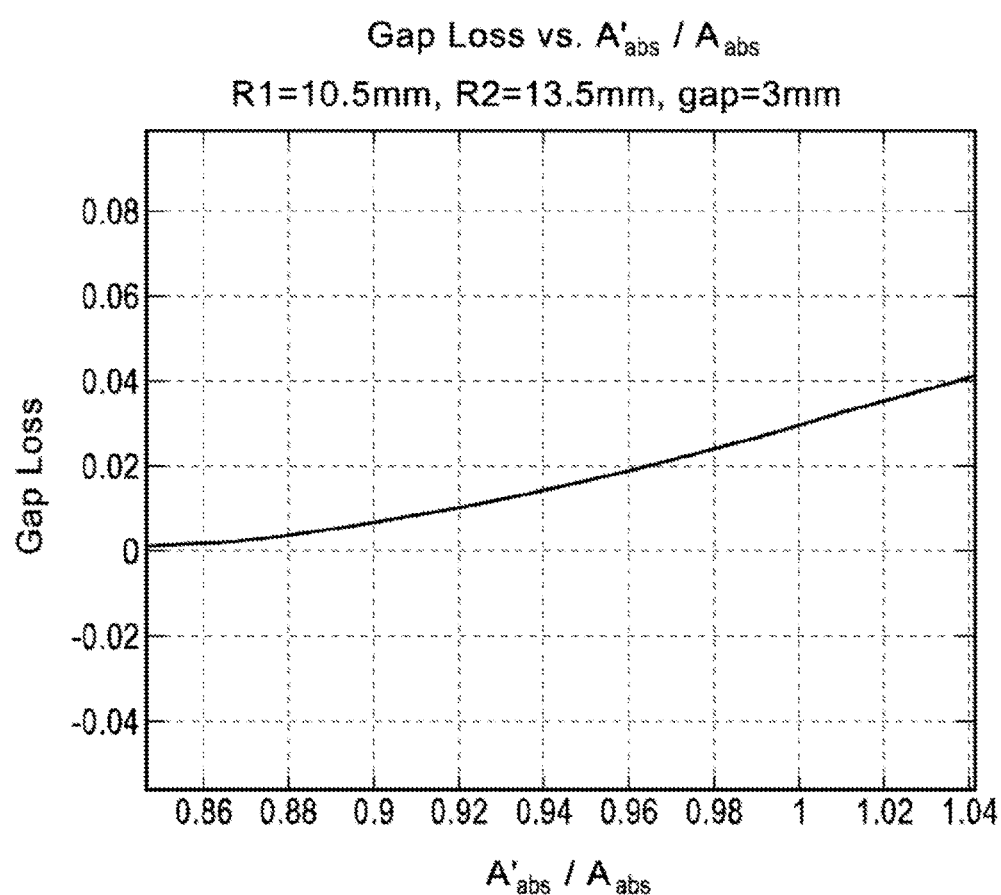
FIG. 16 is a plot of the ratio of virtual absorber area to absorber area vs. gap loss for a concentrator assembly featuring an absorber/concentrator gap.

The cavity design may take a variety of forms, e.g., single or multiple V-shaped grooves or W-shaped grooves. There is a natural upper bound for the groove design in a cylindrical absorber, where the gap distance between the absorber and the concentrator is equal to the radius of the absorber. In the trade-off between concentration and gap loss, the engineering optimum is neither extreme but rather some intermediate choice between a fully cavity immersed absorber, and no cavity at all (i.e., a design based on the virtual absorber technique described above). As shown in FIG. 16, in typical embodiments the concentration increases linearly with gap size, but the gap loss only increases quadratically, thereby favoring partial immersion. Note the gap loss calculated by our thermodynamic (string) method is the average over the acceptance angle. The loss at a particular angle may vary and is typically greatest at zero angle, and substantially zero near the angle of acceptance.

Figure 15A:
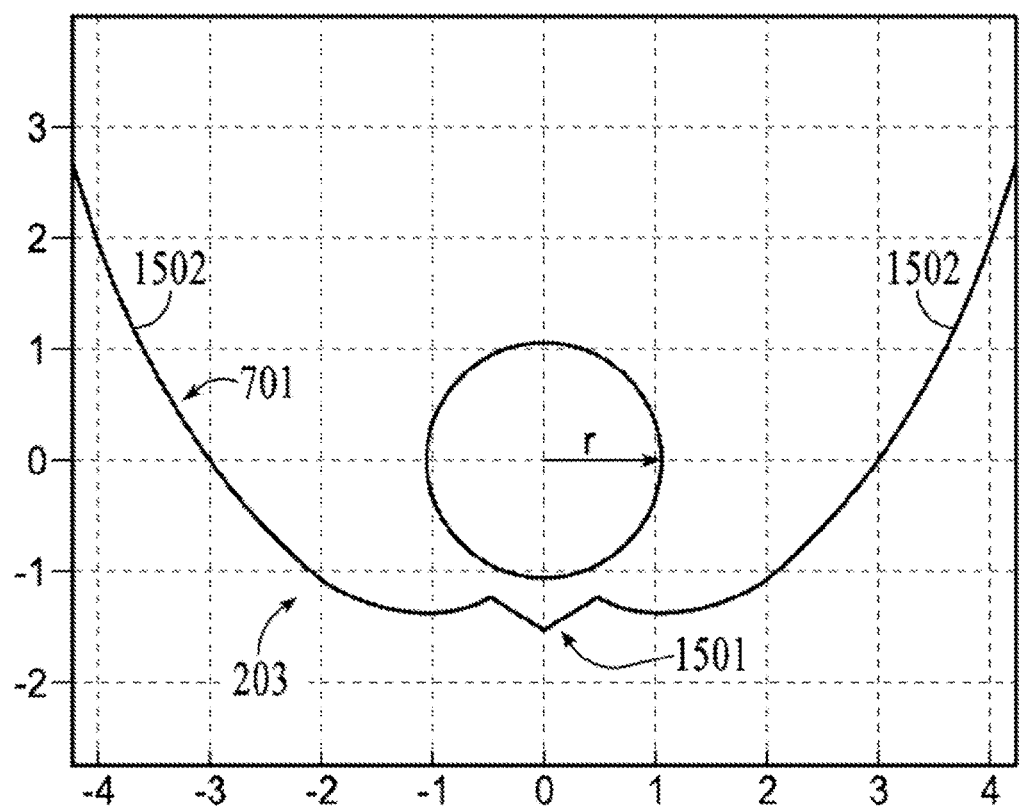
FIGS. 15A and 15B illustrate a concentrator assembly featuring an absorber/concentrator gap, and a design method therefore.

For example, referring to FIG. 15A, trough shaped concentrator 203 features a V-shaped cavity portion 1501 running along the bottom of the trough and providing partial immersion of the cylindrical absorber 204. The shape of the remaining portion 1502 of the trough is determined, e.g., using the virtual absorber and string method described above. As shown, the design is characterized by a virtual to physical absorber ratio of $A'_{abs}/A_{abs}=0.92$ and a gap loss of 0.01.

Appendix 1 includes an exemplary algorithm script written in the well known Scilab scientific computing environment (available at "http://www.scilab.org") for designing a concentrator of the type described above. As will be understood by those skilled in the art, this particular exemplary algorithm may be modified or extended based on particular design requirements.

In other embodiments, other suitable values for $A'_{abs}/A_{abs}$ and gap loss may be chosen. In general, once these values are selected, one is still left with the choice of cavity parameters, e.g., choosing the coordinates of the V-shaped cavity aperture and the opening half angle $\alpha$ of the V. In some embodiments, a large opening angle (i.e. a shallow V) is favorable to minimize material used.

Figure 15B:
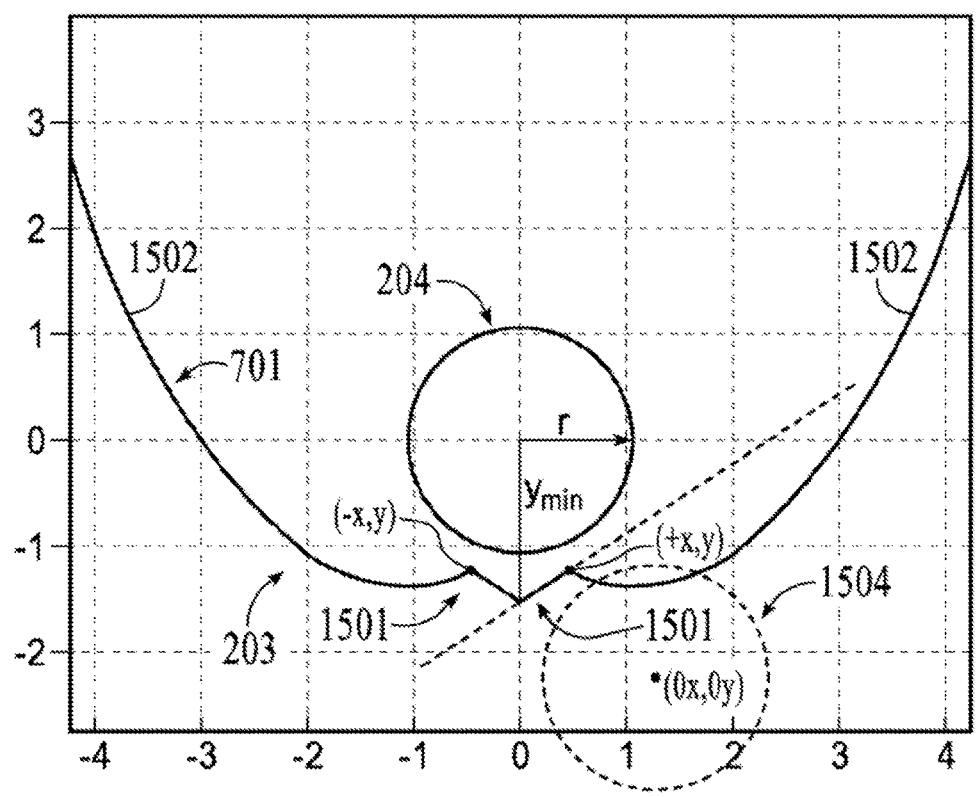

The following describes an exemplary method for determining the cavity parameters. Referring to FIG. 15B, a cylindrical absorber 204 of radius r is centered at the origin. One locates the center $(O_x, O_y)$ of the image 1504 of the cylindrical absorber which would be formed if the reflective V-shaped cavity is extended as shown (indicated with a dotted line), so that the top of the image circle is even with or slightly above the aperture of the cavity. Based on this requirement, the end points of the cavity aperture may be determined. For example, a Scilab script shown in Appendix 1 may be used to determine the position of the end points in an exemplary embodiment. Here, the end points are at coordinates $x=+/-0.48$, $y=-1.25$. The final step in determining the cavity parameters is to determine $y_{min}$. The opening half angle $\alpha$ of the V-shaped cavity and $y_{min}$ are related by $\tan(\alpha)=x/(y-y_{min})$. Further, it can be shown that $O_y=2 y_{min} \sin^2\alpha$.

Based on these relations, one can calculate a table of possible values of $y_{min}$, $\alpha$, $O_y$, $(y-O_y)$ and compare with r to find a reasonable solution. Table 1 below is an exemplary table of values for the design shown in FIGS. 15A-15B. In this case, with $r=1.05$, one sees that $y_{min}=-1.52$ is a reasonable choice.

TABLE 1

| $y_{min}$ | $\alpha$ | $O_y$ | $(y-O_y)$ |
| --- | --- | --- | --- |
| −1.6 | 53.7 | −2.08 | −0.83 |
| −1.54 | 58.8 | −2.25 | −1.10 |
| −1.53 | 59.6 | −2.28 | −1.03 |
| −1.52 | 60.5 | −2.30 | −1.05 |
| −1.50 | 62.3 | −2.35 | −1.30 |
| −1.40 | 72.6 | −2.55 | −1.30 |

Although the specific examples described above have dealt with concentrating radiation to an absorber to generate heat, it is to be understood that in various embodiments the absorber may be a transducer which converts solar light to another form of energy. For example, the absorber may include photovoltaic material which generates electricity in response to incident light. In some embodiments, the absorber may transform incident light into multiple different forms of energy, e.g., electricity and heat. For example, U.S. Provisional Patent Ser. No. 61/378,301, filed Aug. 30, 2010, the entire contents of which are incorporated herein by reference, describes absorbers which include PV material and selective thermal absorbers.

Figure 17A:
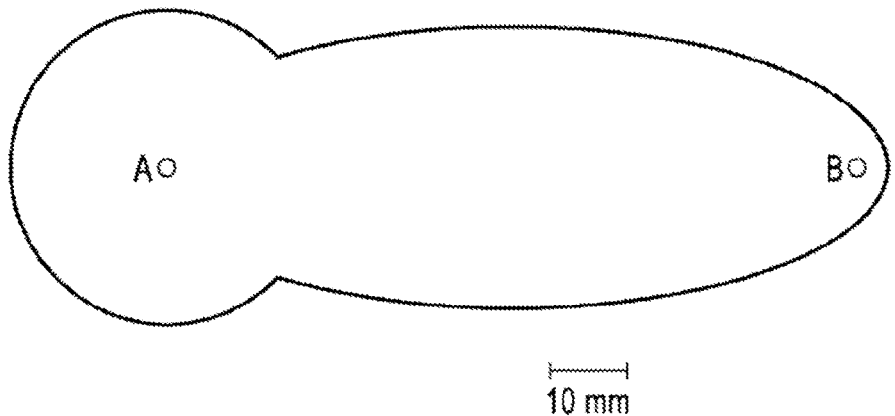
FIGS. 17A-20 show several embodiments of an optimal design concentration schematic.

In contrast to conventional optical design, the solar concentrators of this disclosure are designed from the principles of thermodynamics, and in particular the second law. $TdS=dE+PdV$ is arguably the most important equation in Science. If we were asked to predict what currently accepted principle would be valid 1,000 years from now, the Second Law of thermodynamics would be a good bet. From this we can derive entropic forces: $F=T$ grad $S$, The Stefan-Boltzmann radiation law (const. $T^4$), Information theory (Shannon, Gabor), Accelerated expansion of the Universe, and even Gravity. We can illustrate the Failure of conventional optics by a thought experiment; small bodies A, B at foci of an ellipse as shown in FIG. 17A. A portion of the ellipse is replaced by a sphere centered at A.

It appears that FAB<<FBA where FAB is the probability of radiation starting at A reaching B—etc so A would heat up at the expense of B cooling down, but that violates the second law.

Figure 17B:
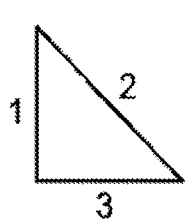

To understand these things it is best to start with the theory of furnaces. We start with a three wall furnace shown in FIG. 17B. Fij are probabilities of radiation from wall i reaching wall j. As there are 6 unknown Fij, six equations are needed. Three come from energy conservation, and 3 from the second law. The results follow readily from inspection.

$$F12=(A1+A2-A3)/(2A1)$$

$$F13=(A1+A3-A2)/(2A1)$$

$$F23=(A2+A3-A1)/(2A2)$$

where A1, A2, A3 are the three sides shown in FIG. 17B.

Figure 17C:
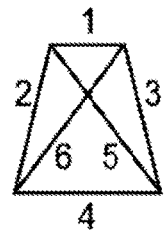

FIG. 17C shows a 4-wall enclosure, which is a configuration of greater interest. The 4-wall enclosure readily reduces to two 3-wall enclosures so that we can apply the above formula.

$$F14=[(A5+A6)-(A2+A3)]/(2A1)$$

$$F23=[(A5+A6)-(A1+A4)]/(2A2).$$

Figure 17D:
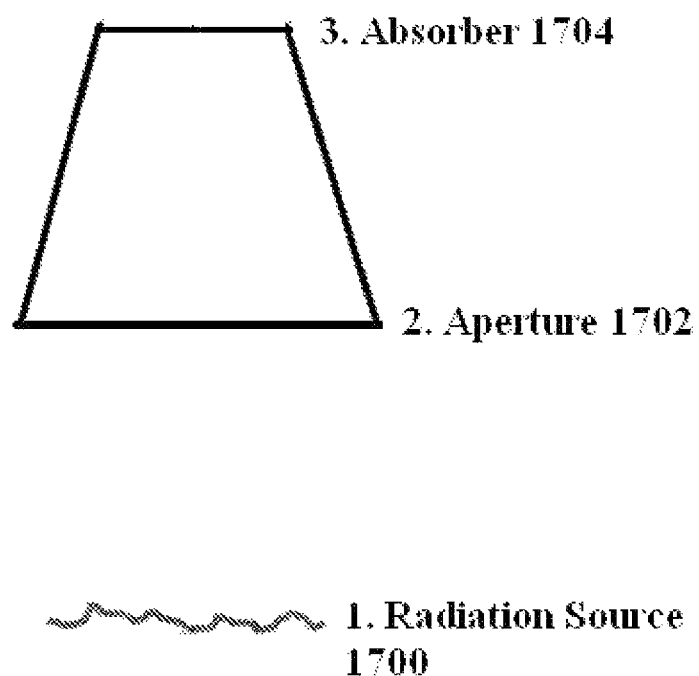

Turning to FIG. 17D, there is shown a schematic view of a radiation source 1700, an aperture 1702 and an absorber 1704 that includes a general convex or flat shape. A number of parameters of the absorber and aperture will be shown and now explained for optimal operation and for manufacturing. The present disclosure includes a convex or flat shape that provides a high probability that the solar radiation will concentrate at a preselected portion to capture as much solar radiation as possible. As can be seen a number of relationships are established between the radiation source, the aperture and the absorber as shown by 1, 2, 3. Suppose the radiation source 1 (example the sun) is maintained at temperature T1. Then the temperature of the absorber 3 will reach T1 if and only if F31=1.

Proof: $q13=\sigma T1^{*4}A1F13=\sigma T1^{*4}A3F31$, where qij is the radiation transfer from i to j.

But $q3total=\sigma T3^{*4}A3 \geq q13$ at steady state.

$T3 \leq T1$ (second law)→$F31=1$ if and only if $T3=T1$.

The first law of thermodynamics (energy conservation) allows q12=q13 which implies F12=F13 for a maximally efficient concentrator. Define the geometric concentration C=A2/A3. The second law requires A1F13=A3F31. Then F12=F13 implies A1F12=A3F31. This implies A3F31 is constant independent of the optical design. C is maximum when A3 is minimum which implies F31 is maximum=1. Again we find that the combination of maximum concentration and maximum efficiency requires F31=1. We can think of this as maximum thermodynamic efficiency. F31=1 also provides an important relation for concentration because A3=A1F12 but A1F12=A2F21 by the second law. It follows that Cmax=1/F21 which expresses maximum concentration as the reciprocal of the probability that radiation from the concentrator aperture (A2) regarded as a black body would reach the source A1.

An important case is the source 1 at ∞ (example very far away, like the sun). Suppose we wish to efficiently concentrate energy from a range of sun angles+/−Θ, for example, a range of angles sufficient to substantially include the solar angles during the year so that tracking is not needed. Mathematically the measure of far away is set by the dimension of A2 (L2) so that far means d>>L2, where d is the distance between 1 and 2. As d approaches ∞ the strings become parallel.

Long String−Short string=$S1-S2=L2 \sin \Theta$.

F21 approaches $\sin \Theta$.

Notice Θ is the maximum angle of radiation incident on A2. Cmax=1/sin Θ.

Figure 18:
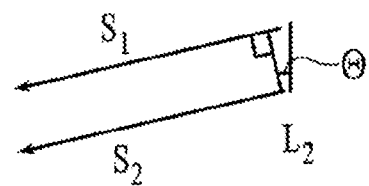
Figure 19:
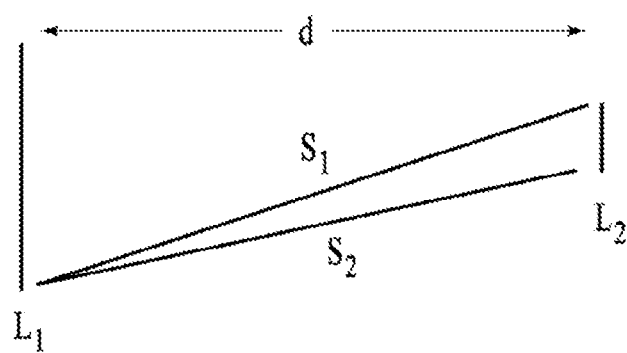

As the distance approaches infinity, the sun's rays appear almost parallel to one another. Therefore, as we approach infinity, F21 is equal to sin Θ, where Θ is equal to the angle of the essentially parallel sun's rays at one sun angle with respect to the axis as shown in FIG. 18. Therefore, Cmax=1/sin Θ and note that in this embodiment, the maximum angle on A2 is Θ. For three dimensions, $$F21=(S1-S2^2/L2^2),$$

where L2 is the diameter of A2. As we approach infinity, F21 is equal to sine $\Theta^2$.

Therefore Cmax=1/sin$^2$ Θ, another example of the principle that maximum concentration is the reciprocal of the probability that radiation from the concentrator aperture regarded as a black body would reach the source.

Figure 20:
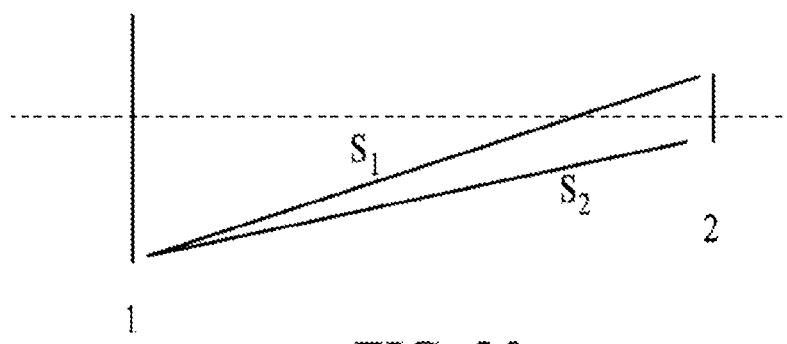

Another way to obtain the sine law is to consider the angular momentum with respect to the axis of symmetry shown in FIG. 20. The optical momentum is P=n(L, M, N), where n is the index of refraction and L, M, N are the direction cosines of the rays and the maximum angular momentum at the entrance A2 of the concentrator is J=(L2/2) sin Θ, and at the exit A3 the maximum value of J is L3/2, where L3 is the diameter of A3. Since J is conserved, the maximum concentration is $(L2/L3)^2=1/\sin^e \Theta$. For simplicity we have assumed n=1 in this example.

In another embodiment of the present disclosure, the present invention may be used in a water desalination and purification plant that removes salt from various types of water sources including sea water, brackish water etc. with the objective of providing fresh water for every day consumer use. There are two main types of desalination technologies that are most prevalent today. The most common are various distillation processes that require high temperatures for operation. The second type is reverse osmosis, which requires high pressure to drive pure water through a membrane separation process. Water purification focuses more on the removal of various particulate, organic and inorganic impurities from existing fresh water supplies or when attempting to implement water reclamation projects.

In another embodiment of the present disclosure, the solar array may include a reflective surface that is a Compound Parabolic Concentrator (CPC). For example, the reflective surface may include a two dimension compact parabolic concentrator that is an ideal concentrator, i.e., it works perfectly for all rays within the acceptance angle q, and rotating the profile about the axis of symmetry gives the 3-D CPC. The 3-D CPC is very close to ideal reflective surface.

In another embodiment of the present disclosure, the solar array may also include Collimator for a Tubular Light Source. The collimator may include a predetermined shape on each side of the tubular light source to collect the light in a predetermined location as discussed.

Although the specific examples described above have dealt with concentrating radiation from a relatively large solid angle of incidence onto a relatively small target (e.g. concentrating solar light onto an absorber), it will be understood that they may equally well be applied to broadcasting radiation from a relatively small source to a relatively large solid angle (e.g. collecting light from an LED chip to form a beam or sheet of light). The small source may, for example, include a light emitting diode, an organic light emitting diode, a laser, or a lamp.

Although a number of exemplary light concentrators have been described, in various embodiments, any other suitable concentrator may be used. For example, in some embodiments, non-imaging concentrators of the type described in Roland Winston et al, Nonimaging Optics, Academic Press (Elsevier, 2005) may be used, including concentrator designed using the edge ray principle as described therein. In various embodiments concentrators may include reflective, refraction, diffractive or other elements. In some embodiments, at least a portion of the concentrator may reflect light by total internal reflection.

One or more or any part thereof of the techniques described herein can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention.

As used herein the term "light" and related terms (e.g. "optical") are to be understood to include electromagnetic radiation both within and outside of the visible spectrum, including, for example, ultraviolet and infrared radiation.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

Definitions that are contained in text incorporated by reference are excluded to the extent that they contradict definitions in this disclosure. For the purposes of this disclosure and unless otherwise specified, "a" or "an" means "one or more."

As used herein, the term "comprising" is intended to mean that the compositions and methods include the recited elements, but not excluding others. "Consisting essentially of" when used to define compositions and methods, shall mean excluding other elements of any essential significance to the combination for that intended purpose. "Consisting of" shall mean excluding more than trace elements of other ingredients and substantial method steps for making or using the concentrators or articles of this invention.

The construction and arrangements of the solar energy concentrator, as shown in the various exemplary embodiments, are illustrative only. Although only a few embodiments have been described in detail in this disclosure, many modifications are possible (example, variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

APPENDIX I

%Mind the Gap Version 2
N0=1000;
N1=100;
N2=1000;
%Define parameters
R=1.05; %10.5mm
R1=1.35; % 13.5mm APPENDIX I-continued

```
D1=2.7; %27mm
theta=(2*pi/360)*(40); %40deg
phi=(2*pi/360)* 14; %14deg
psi=(pi/2)+theta;
scale=1.0;
% ------------------------------------------------------------
L1 =scale*pi*R*
(1/(sin(theta)^2)+((cot(theta))^2)*(1/(sin(theta))+1)^2)^(1/2);
inc=(L 1 +3 * R)/N2;
L=(5*R*pi/2)+(R*(theta-2*phi))+L1;
% ------------------------------------------------------------
x0=R*sin(psi)-L1 *sin(theta);
y0=-R*cos(psi)+L1 *cos(theta);
% ------------------------------------------------------------
%profile for involution
gamma=(psi-phi)/N1;
s1=(psi-phi)*R;
xi(1)=R*cos(theta)+s1*sin(theta);
yi(1)=R* sin(theta)-s1*cos(theta);
xl(1)=-xi(1);
rho(1)=sqrt(xi(1)^2+yi(1)^2);
n=1;
while (rho>=R1);
    sn=s1 -R*((n-1)*gamma);
    xi(n)=R*cos(theta-(n-1)*gamma)+sn*sin(theta-(n-1)*gamma);
    yi(n)=R* sin(theta-(n-1)*gamma)-sn*cos(theta-(n-1)*gamma);
    xl(n)=-xi(n);
    rho=sqrt(xi(n)^2+yi(n)^2)
    n=n+1
    %vee
    a=-xi(n-1);
    b=yi(n-1);
end;
%Vee
c=-1.54; %ymin
x6(1)=-a
y6(1)=b
x6(2)=0;
y6(2)=c;
x6(3)=a;
y6(3)=b;
%------------------------------------------------------
%profile for one reflection
flag=0;
i=0;
s=(2*cos(theta)/N0)*(L1* sin(theta)-R*sin(psi));
%------------------------------------------------------
for n=1:N0;
    i=0; flag=0;
    xn=((n-1)*s)/cos(theta)+x0;
    Lt=L-((n-1)*s*tan(theta));
    % ----------------------------------------------
    while(flag==0)
    i=i+1;
    sL=i*inc;
    xtn=sL*sin(theta)+xn;
    ytn=y0-sL*cos(theta);
    % ----------------------------------------------
    Rt=(xtn^2+ytn^2)^(1/2);
    beta1=asin(ytn/Rt);
    beta2=acos(R/Rt);
    % ----------------------------------------------
    alpha=(3*pi/2)-(beta1+beta2);
    Lt2=sL+(xtn^2+ytn^2-R^2)^(1/2)+R* alpha;
    if((Lt2>=Lt)&(flag==0))
        flag=1;
        x(n)=xtn;
        y(n)=ytn;
        x2(n)=-xtn;
    end;
    end;
end;
d=8.5; %85mm
xt(1)=x(1);
yt(1)=y(1);
xtl(1)=-xt(1);
n=1;
    while (x(n)<=d/2)
    xt(n)=x(n);
    yt(n)=y(n);
    xtl(n)=-x(n);
    n=n+1;
end;
%------------------------------------------------------
%absorber circle profile
for j=1:100;
    angle=(j-1)*2*pi/100;
    x3(j)=R*cos(angle);
    y3(j)=R* sin(angle);
end;
%------------------------------------------------------
%Output values
plot(xi,yi,x1,yi,xt,yt,xt1,yt,x3,y3,x6,y6);
axis equal;
grid;
title('theta=40deg, phi=14deg, R=1.05cm, R1=1.35cm,
ymin=-1.54cm,d=8.5cm');
c,xi,yi,xt,yt
print,
==========================================================
%maximizes CPC with gap
%r2=r1+gap
%Cmax=1/sin(theta);
%x=C/Cmax;
%y=gap Loss *(C/Cmax);
r1=1.05;
r2=1.35;
z=r2/r1;
alf=acos(r1/r2);
bet=sqrt(z*z-1)-alf;
fi=asin(r1/r2);
psimin=fi;
xmin=(psimin+fi+1/tan(fi))/pi;
xmax=1+bet/pi;
for i=1:10;
    x(i)=xmin+i *(xmax-xmin)/10;
    psi=pi *x(i)-(fi+1/tan(fi));
    y(i)=(fi+1/tan(fi))-(psi+cos(psi)/sin(fi));
    y(i)=y(i)/pi;
end;
xmax
plot(x,y)
axis equal;
grid;
title('R1=10.5mm,R2=13.5mm,gap=3mm');
print,
```

What is claimed is:

1. A trough-shaped solar energy concentrator, the solar energy concentrator being elongated along a longitudinal axis, the solar energy concentrator comprising:

a) an absorber configured to absorb a light ray from the sun striking the absorber, the absorber defining a polygon in cross section orthogonal to the longitudinal axis, the absorber being elongated along the longitudinal axis;

b) a reflector, the reflector being elongated along the longitudinal axis, the reflector having two reflector sides that are bilaterally symmetrical about an optic plane, the two reflector sides defining opposing edges, the opposing edges defining an aperture between the opposing edges, the aperture being elongated along the longitudinal axis, the aperture being configured to receive the light ray and to allow the light ray to pass to the reflector;

c) each of the two reflector sides distal to the absorber defining a curve normal to the longitudinal axis, the curve being defined mathematically by a plurality of curve points, each curve point being characterized by a junction of a first line segment and a second line segment, the first and second line segments each being mathematical and not being a physical object;

d) wherein an end of the first line segment is fixed at a surface of the absorber and the first line segment wraps about the absorber, for each curve point the first line segment is straight from the absorber to the curve point, the first line segment defining a first line segment length from the end of the first line segment to the curve point;

e) wherein for each curve point an end of the second line segment is located on an edge line, the edge line being orthogonal to the light ray when the light ray is at an acceptance angle at which the light ray passing through the aperture will be reflected onto the absorber by the reflector, the edge line being disposed between the absorber and the sun when the light ray is at the acceptance angle, wherein the second line segment is parallel to the light ray at the acceptance angle, the second line segment defining a second line segment length from the end of the second line segment at the edge line to the curve point corresponding to the second line segment; and (f) wherein the sum of the lengths of the first and second line segments for each of the curve points is constant.

2. The apparatus of claim 1, wherein the polygon is a square.

3. The apparatus of claim 1, wherein the polygon is a regular polygon.

4. The apparatus of claim 1, wherein the polygon is an irregular polygon.

* * * * *